United States Patent
Shepherd

(12) 
(10) Patent No.: US 6,205,136 B1
(45) Date of Patent: Mar. 20, 2001

(54) CONTROL OF SWITCHING IN A TELECOMMUNICATION NETWORK

(75) Inventor: John William Shepherd, Kent (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/043,172

(22) PCT Filed: Apr. 11, 1997

(86) PCT No.: PCT/GB97/01011

§ 371 Date: Mar. 12, 1998

§ 102(e) Date: Mar. 12, 1998

(87) PCT Pub. No.: WO97/39601

PCT Pub. Date: Oct. 22, 1997

(30) Foreign Application Priority Data

Apr. 17, 1996 (GB) .................................................. 9607921

(51) Int. Cl.[7] .................................................. H04L 12/00
(52) U.S. Cl. .......................................... 370/360; 379/229
(58) Field of Search .................................... 370/299, 360, 370/384, 396; 379/154, 229, 234, 268, 284

(56) References Cited

U.S. PATENT DOCUMENTS 5,461,669 * 10/1995 Vilain .................................... 379/350
5,664,102 * 9/1997 Faynberg ............................. 709/246

FOREIGN PATENT DOCUMENTS

| 217 351 | 4/1987 | (EP) . |
| 703 531 | 3/1996 | (EP) . |
| 702 497 | 3/1998 | (EP) . |
| 2 264 575 | 9/1993 | (GB) . |

OTHER PUBLICATIONS

IEEE International Conference on Communications, ICC '90, Session 319 Paper 2, vol. 3, Apr. 15, 1990, Atlanta US, pp. 857–860, Dreher, "A highly distributed switching system architecture".

IEEE Global Telecommunications Conference, GLOBECOM '93, vol. 1, Nov. 29, 1993, Houston, US, pp. 357–361, Rozenblit, "OA&M capabilities for switching software management".

* cited by examiner

Primary Examiner—Hassan Kizou
Assistant Examiner—Ahmed Elallam
(74) Attorney, Agent, or Firm—Nixon & Vanderhye P.C.

(57) ABSTRACT

A telecommunication network includes a local switch for receiving and switching a telecommunication signal to remote switches in the network. A local control arrangement is provided which includes a memory for storing instructions and data and which uses the stored instructions and data to control the switching operation of the local switch. A remote control arrangement is provided which also includes a memory for storing equivalent instructions and data. The remote control arrangement is also adapted to control the switching operation of the local switch and the local switch can be controlled by either the local or the remote control arrangements. A manager is provided for modifying the instructions and data in the memories of the local and remote control means and modify the instructions and data in either the local or remote control arrangements immediately. A marker is then sent to the other of the local or remote control means to mark the instructions and data as being out of date. The manager can then modify the marked instructions and data at a later date. The switch is arranged to initially request control from the local control arrangement and the marker is checked to determine if the instructions and data in the local control arrangement are up to date. If not, control is passed to the remote control arrangement.

49 Claims, 23 Drawing Sheets

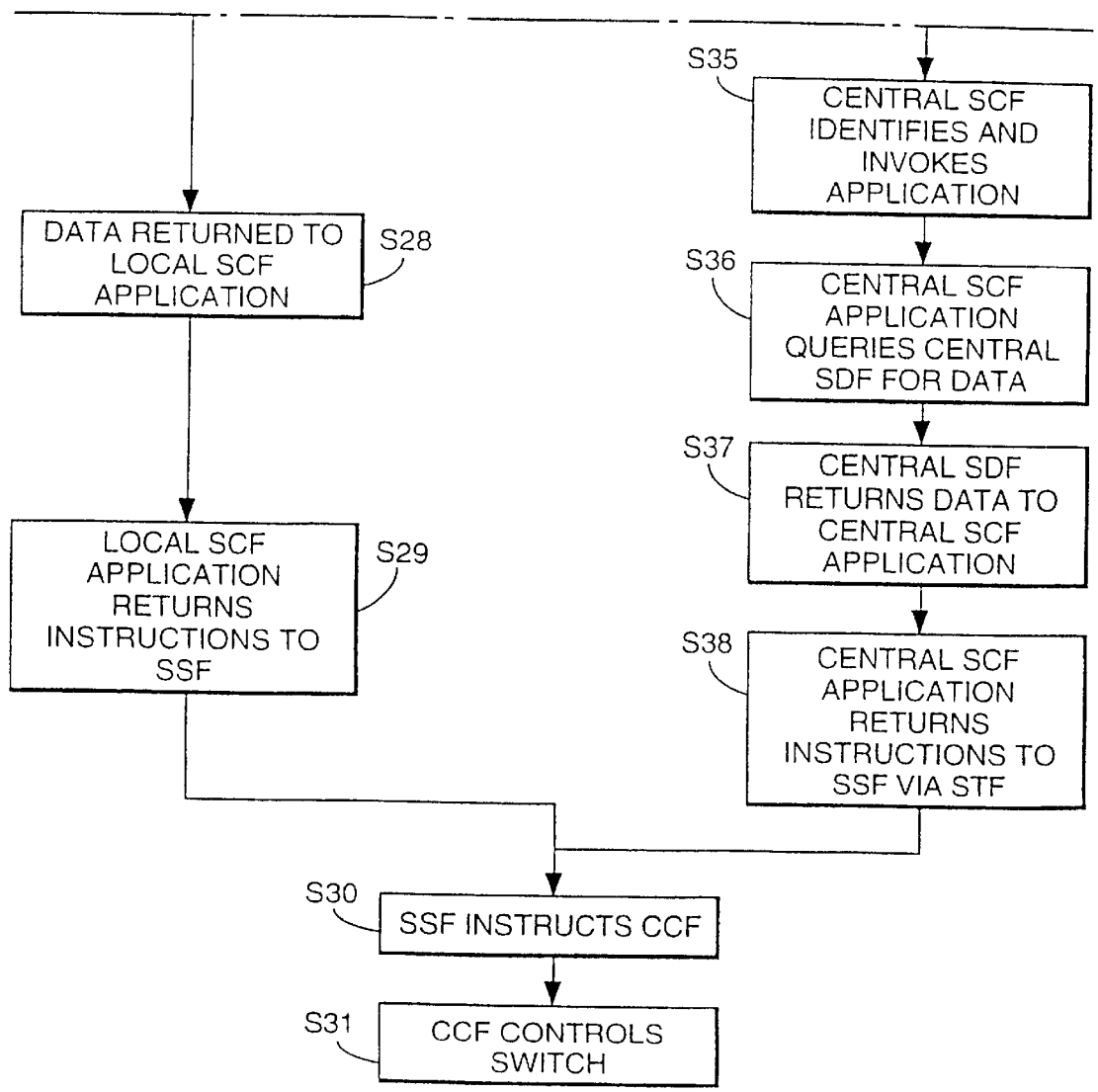

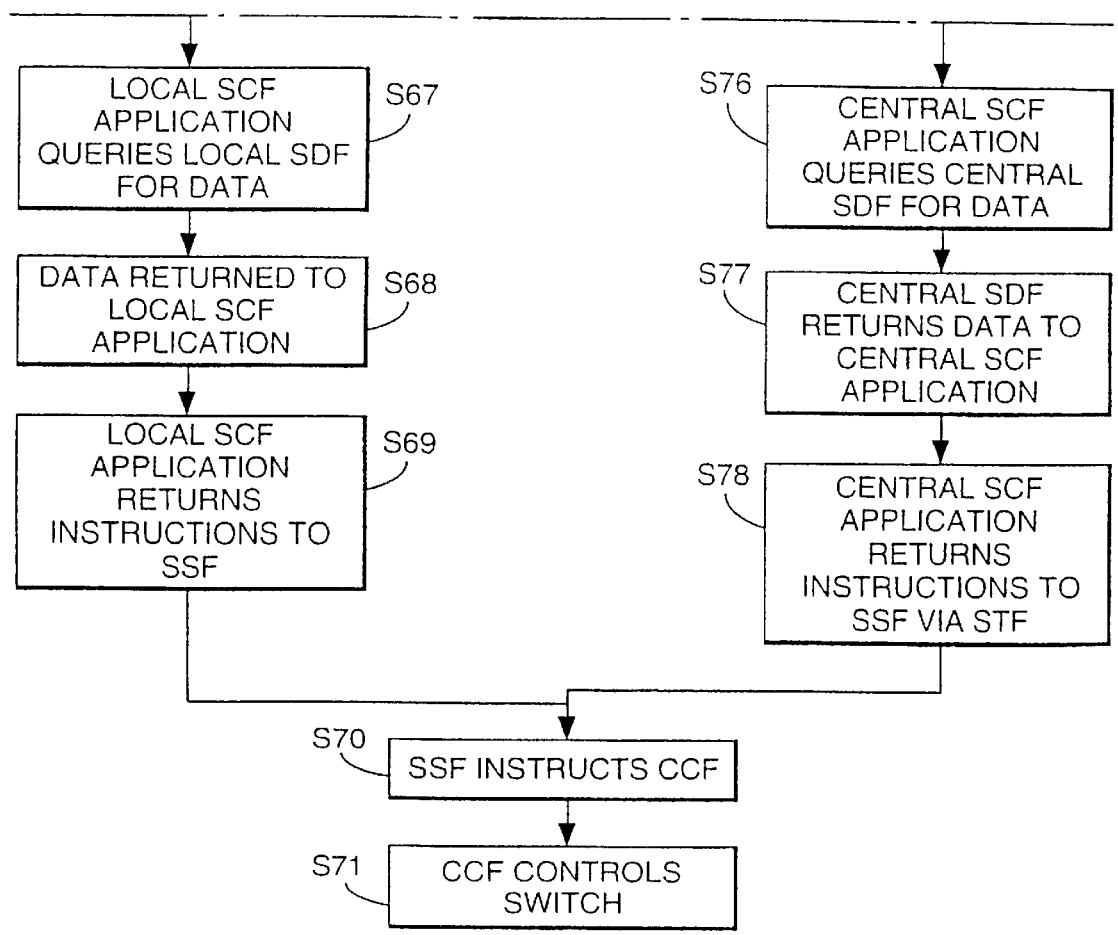

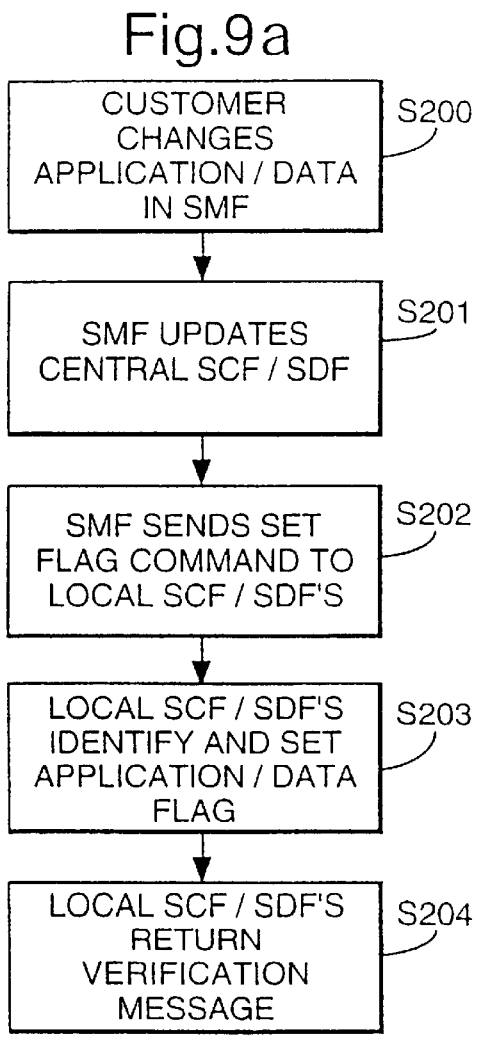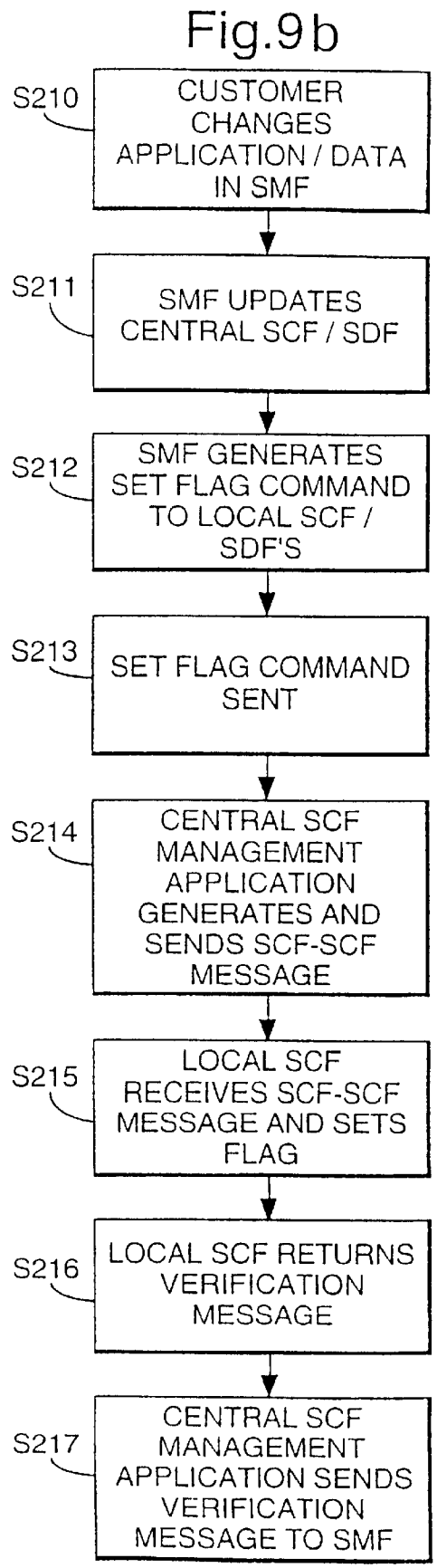

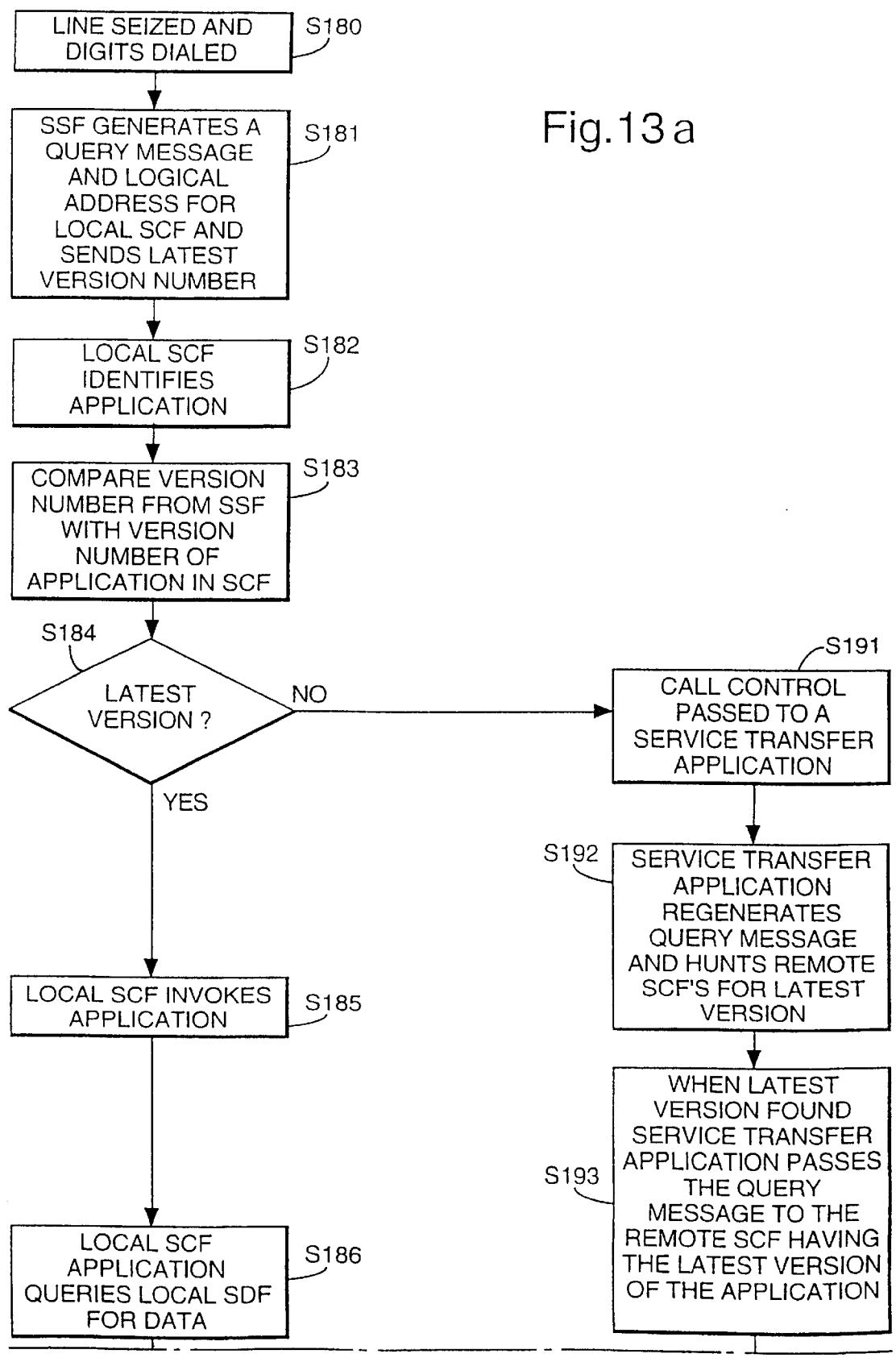

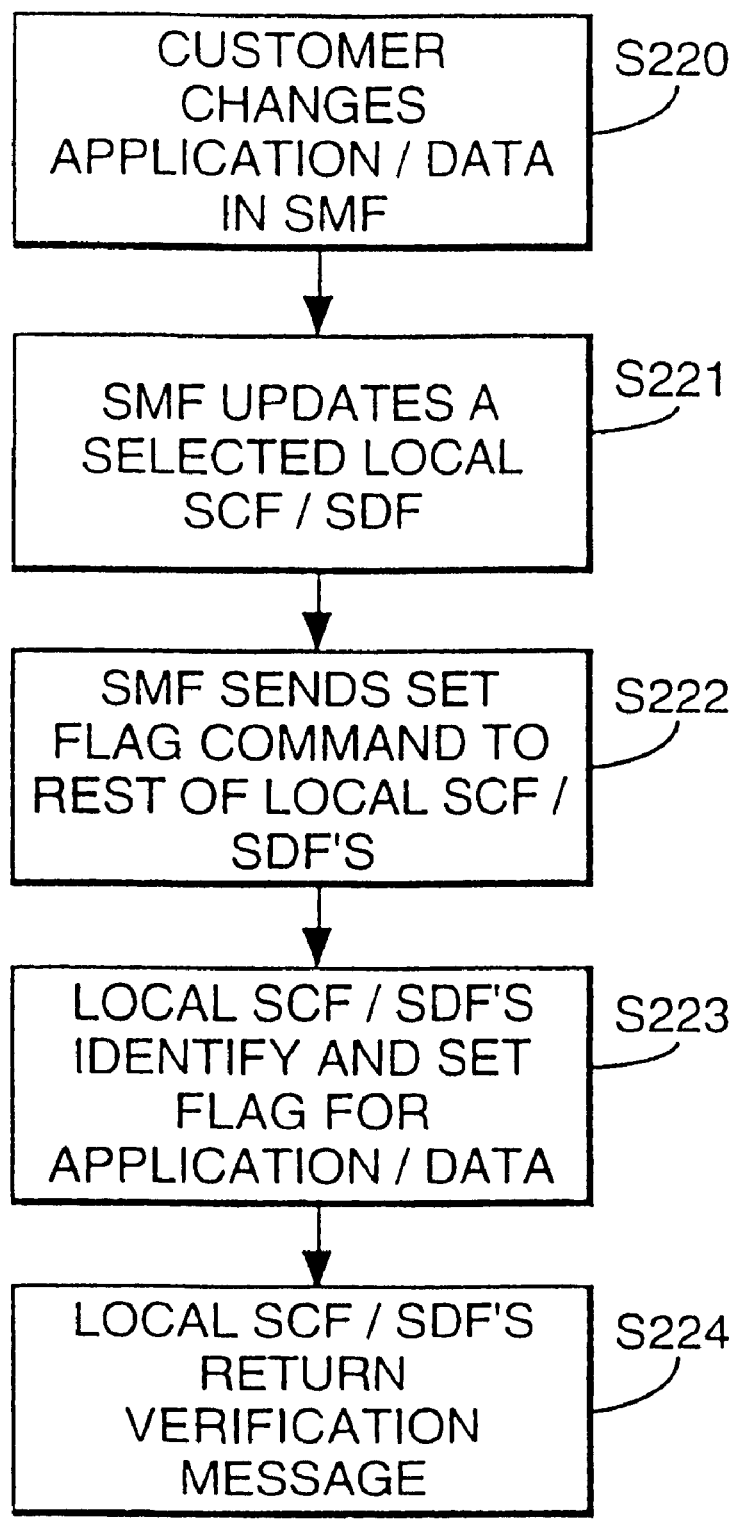

CONTROL OF SWITCHING IN A TELECOMMUNICATION NETWORK

BACKGROUND OF THE INVENTION

1. Field of the Invention

The present invention relates in general to a telecommunication network and a method of controlling the switching of a telecommunication signal in a telecommunication network. More particularly, the present invention relates to the control arrangement for controlling the switching of a telecommunication signal in a telecommunication network.

2. Related Art

In a modern telecommunication network there is a need to provide flexible call control architectures of the switched networks to facilitate the implementation of new features and services. Networks which provide such flexibility have been termed 'intelligent networks' and are discussed in detail in "Intelligent Networks" by Jan Thörner (Artech House. Boston. London).

A typical intelligent network is illustrated in FIG. 1. In such a network when a local exchange 1 receives a telecommunication signal from a telephone 2, the signal is interpreted by the call control function (CCF). Limited processing of the telecommunication signal can take place within the service switching function (SSF). However, if more advanced processing is required the SSF has the ability to generate a query i.e. a request for control from a centralised transaction processor termed the service control function (SCF). The query from the SSF is passed initially to a signalling transfer function which routes the query to the required SCF. The SCF is a centralised transaction processor which hosts advanced services controlled software termed service logic programs (SLPs) or applications. When an SCF receives a query, an application will be initiated which requires data. The application running in the SCF refers to a service data function (SDF) for the requisite data. The SCF can then return instructions to the SSF in the local exchange 1 via the STF.

The advantage of this arrangement is that the advanced services are provided at a centralised location. This enables both the applications in the SCF and the data in the SDF to be updated as desired when advanced services are to be updated. A customer is able to modify the applications for data in the SCF and SDF respectively by changing the application or data in a service management function (SMF). The SMF is able to update the applications and data in the SCFs and SDFs respectively easily in view of their centralisation location. The SMF is also able to manage the STF and SSF if required.

In order to standardise communication over intelligent networks, various standard signalling protocols have been agreed. For instance, communication between the SSFs, the STFs, the SCFs and the SDFs can be achieved using the CCITT (Consultative Council of International Telephone and Telegraph) 7 common channelling signalling network. The CCITT 7 protocol comprises a signalling connection control part (SCCP) and transaction capabilities (TCs). In addition an intelligent network application part (INAP) can be stacked on this C7 transport.

The communication of the management functions from the service management function can be carried out using an asynchronous transfer mode (ATM) X25 link which uses a file transfer protocol (FTP) for the transfer of management data e.g. for the updating of the applications and data in the SCFs and SDFs respectively.

A centralised architecture has the advantage that it provides for flexibility compared with a distributed network. It also provides savings on management network infra structure since the centralised applications and data only have to be updated for one location. In a distributed network the applications and data would need to be updated throughout the network.

The centralised network however suffers from the disadvantage that the SSF must transmit a query to a centralised SCF thus causing switching delays for the signal over the speech path.

SUMMARY OF THE INVENTION

It is therefore an object of the present invention to reduce the switching delay in a telecommunication network without requiring a significant increase in the signalling network infra structure compared to the prior art centralised structure.

In accordance with one aspect, the present invention provides a telecommunication network comprising:

local switch means for receiving and switching a telecommunication signal to remote switch means in the network;

local control means including storage means for storing instructions and/or data, said local control means being adapted to use said stored instructions and/or data to control the switching operation of said local switch means;

remote control means including storage means for storing instructions and/or data equivalent to the instructions and/or data stored in said storage means of said local control means, said remote control means being adapted to control the switching operation of said local switch means, said local switch means being controlled by either said local control means or said remote control means;

management means for modifying said instructions and/or data of said storage means of said local and remote control means, said management means being adapted to modify said instructions and/or data of said storage means of one of said local and remote control means immediately, to associate a marker with said instructions and/or data in said storage means of said local control means to indicate whether said storage means of said local control means contains the most recently modified instructions and/or data, and to similarly modify said instructions and/or data of said storage means of the others of said local and remote control means subsequently;

said switching means being adapted to request control from said local control means;

marker checking means for checking said marker to determine if said instructions and/or data in said storage means of said local control means are the most recently modified instructions and/or data; and passing means responsive to said marker means for passing the control request from said local switch means to said remote control means if said marker checking means determines that said instructions and/or data are not the most recently modified instructions and/or data.

In accordance with a second aspect, the present invention provides a method of controlling the switching of a telecommunication signal in a telecommunication network comprising local switch means for switching the telecommunication signal, local control means containing instructions and/or data for controlling the switching operation of said switch means, and remote control means containing equivalent instructions and/or data for controlling the switching operation of said switch means, the method comprising:

control modification steps of
modifying said instructions and/or data in one of said local and remote control means;
associating a marker with said instructions and/or data contained in said local control means to indicate wherein said local control means contains the most recently modified instructions and/or data;
subsequently similarly modifying said instructions and/or data of the other of said local and remote control means;
and switching control steps of
said local switch means requesting control from said local control means;
checking said marker to determine if said instructions and/or data of said local control means is not the most recently modified instructions and/or data; and
if it is determined that said instructions and/or data are not the most recently modified instruction and/or data;
passing the control request from said local switch means to said remote control means and controlling said local switch means from said remote control means, or if it is determined that said instructions and/or data re the most recently modified instructions and/or data, controlling said local switch means from said local control means.

In accordance with the third aspect, the present invention provides a local switching arrangement for use in the method of any one of claims 29 to 38 comprising:

said local switching means for receiving and switching a telecommunication signal to remote switch means in the telecommunication network;
said local control means including storage means for storing instructions and/or data and a marker associated with said instructions and/or dat, said local control means being adapted to use said stored instructions and/or data to control the switching operation of said local switch means;
receiving means for receiving instructions to set said marker to mark said instructions and/or data as being out of date;
said switch means being adapted to request control from said local control means;
marker checking means for checking said marker to determine if said instructions and/or data are out of date;
passing means responsive to said marker means for passing the control request from said local control means to a similar remote control means if said marker checking means determines that said instructions and/or data are out of date;
said receiving means being adapted to receive instructions to update said instructions and/or data stored in said storage means and to reset said marker to mark said instructions and/or data as being updated.

By providing both local control means and remote control means which mirror the instructions (or applications) and data, and by providing a marker such as a flag to mark the local control means as being out of date if the remote control means has been updated, the present invention provides for a greatly reduced switching delay compared to a centralised network without requiring the simultaneous real time updating of all of the local control means required in a decentralised network. The local switch means will initially refer to the local control means for control. If however the instructions and/or data in the local control means has been marked as being out of date compared with the instructions and/or data which have been updated in the remote control means, the switch means will refer to the remote control means for control.

The management means operates by updating the remote control means as a priority whereupon the local control means are marked as being out of date. Subsequently, when the flow of traffic over the communication paths permits, the management means will update the local control means and reset the mark.

Thus, the switch means will have to refer to the remote control means for control for a period after there has been update until the local control means is updated. Normally the switch means will refer to the local control means for control. In this way the switching delays in the telecommunication network are greatly reduced compared to a centralised network and the need for fast updates of the local control means is removed compared with a decentralised network.

Although the present invention is applicable to a telecommunication network having local control means and central control means, the present invention can also be applied to a telecommunication network having a plurality of like local control means.

In embodiments of the present invention, the instructions and/or data in the local control means can be marked by for example setting and resetting a flag, assigning a version number to each set of instructions, or, the address of the data or the application can simply be deleted when out of date.

When a flag or version number is used to mark the instructions and/or data, the flag or version number can be stored at any location e.g. in the local STF, the local SCF, or the local SDF.

In a centralised system having local control means and central control means, the management means can communicate with local control means either directly or via the central control means. In a distributed network of a plurality of local control means, the management means can communicate with each of the local control means using a wide area network. This also enables each of the local control means to communicate with one another which is necessary to enable them to locate the most recently modified instructions and/or data.

BRIEF DESCRIPTION OF THE DRAWINGS

Embodiments of the present invention will now be described with reference to the accompanying drawings in which:

FIGS. 6a and 6b provide a flow diagram of a fourth switching control method using the first embodiment of the present invention;

FIGS. 9A and 9B are flow diagrams of methods of modifying or updating the applications and/or data in the local SCF/SDFs of the first embodiment of the present invention;

FIGS. 13a and 13b provide a flow diagram of a third switching control method using the second embodiment of the present invention; and FIG. 14 is a flow diagram illustrating a method of modifying or updating the applications and/or data in the local SCF/SDFs of the second embodiment of the present invention.

DETAILED DESCRIPTION OF EXEMPLARY EMBODIMENTS

Figure 1:
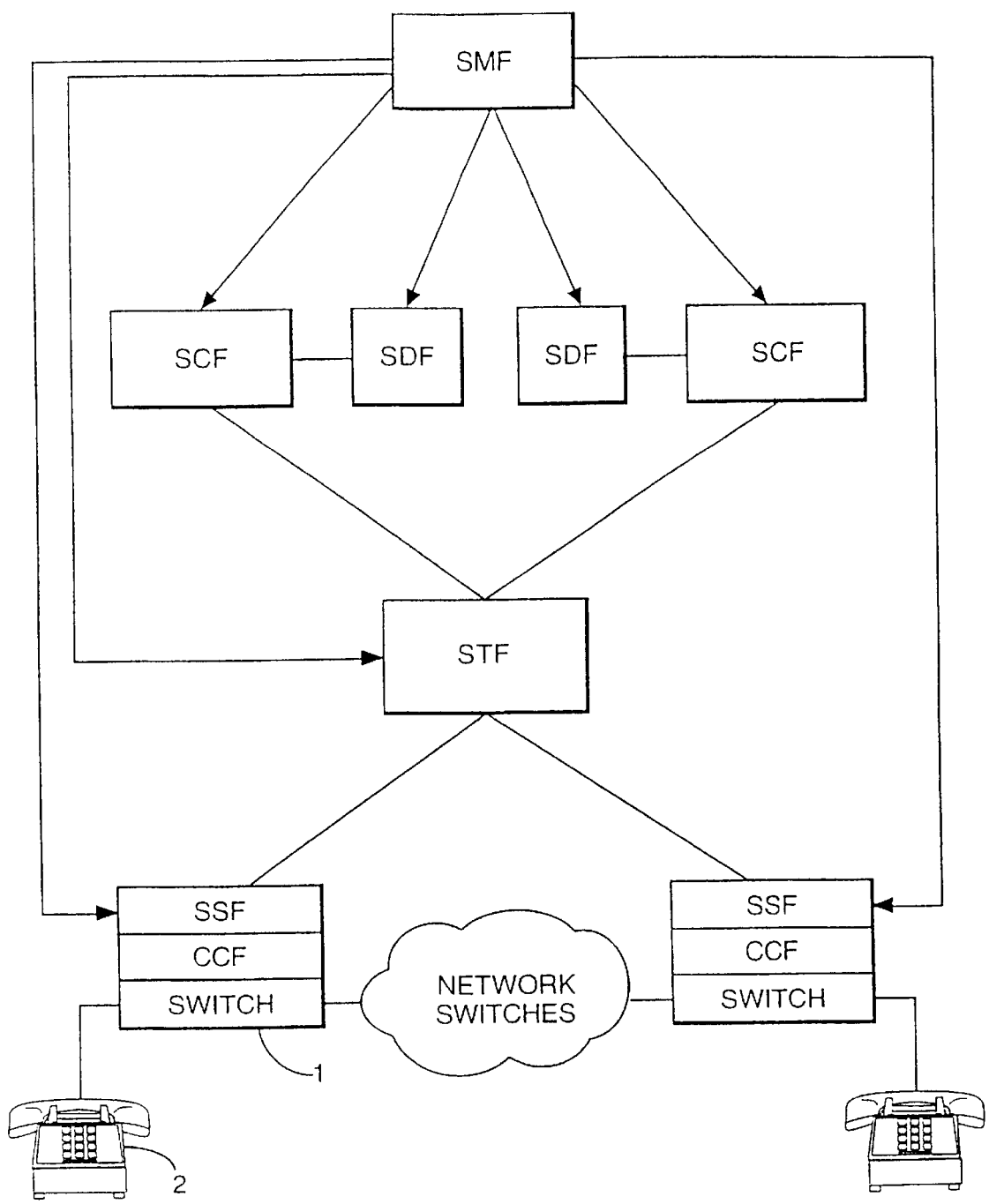
FIG. 1 is a schematic drawing of a prior art centralised telecommunication network.
Figure 2:
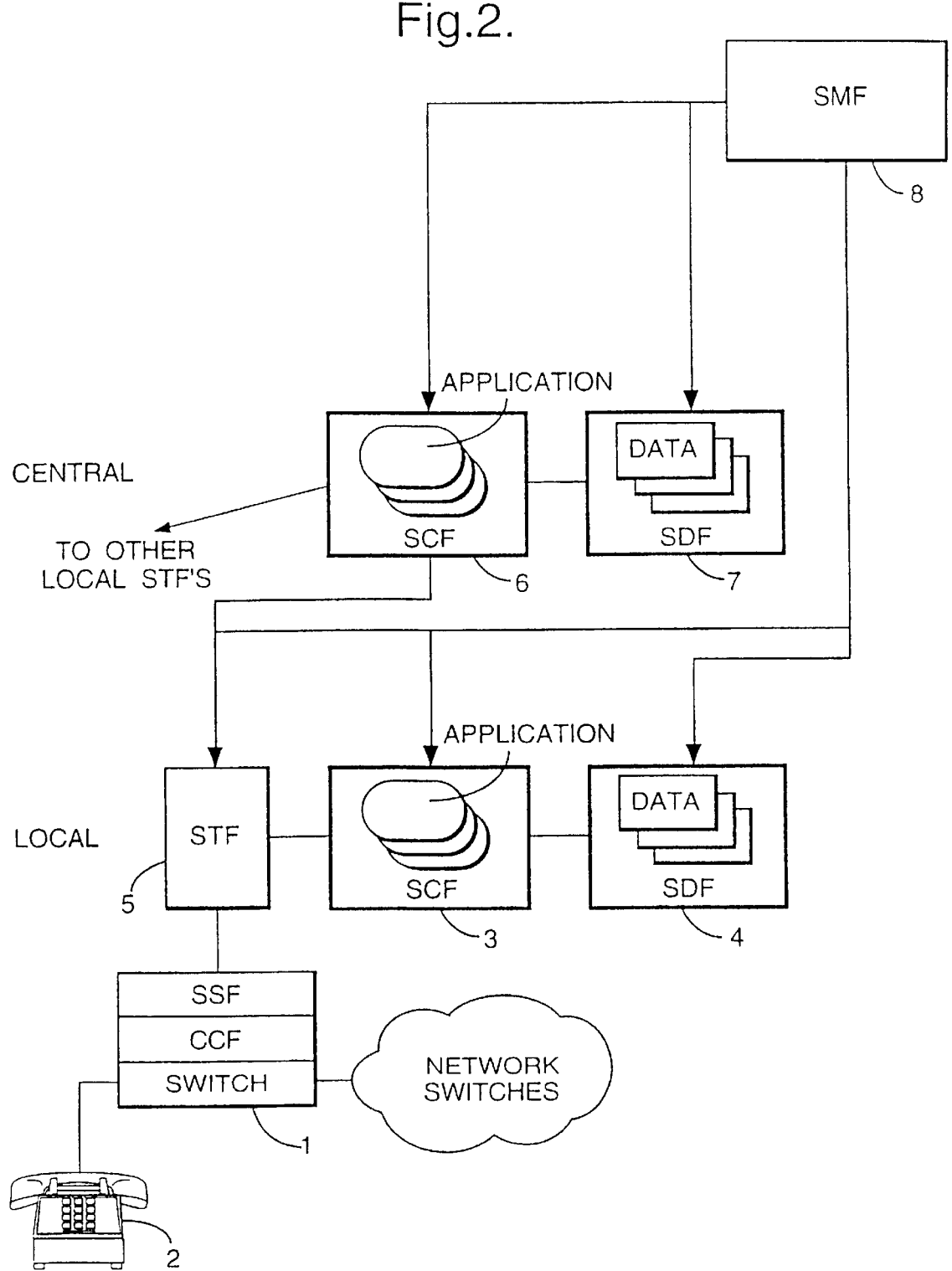
FIG. 2 is a schematic drawing of a centralised telecommunication network in accordance with one embodiment of the present invention.

Referring now to the drawings, FIG. 2 schematically illustrates a centralised telecommunication network in accordance with one embodiment of the present invention. FIG. 2 differs from the prior art in that a local exchange 1 is provided with a local service control function (SCF) 3, a local service data function (SDF) 4, and a local service transfer function (STF) 5. The STF 5 receives the query from the SSF in the local exchange 1 and can either route the query to the local SCF 3 or to the central SCF 6 with its associated central SDF 7, in dependent upon whether the local SCF 3 and local SDF 4 have been marked as being out of date in view of a recent update. The service management function (SMF) 8 is able to update the applications and data in the central SCF 6 and central SDF 7 as well as the local SCF 3 and local SDF 4.

In this embodiment the signalling protocols used by the SSF of the local exchange 1, the local STF 5, the local SCF 3, the local SDF 4, the central SCF 6 and the central SDF 7 can be the same as the prior art i.e. the C7 transport protocol with for instance INAP stacked on top. The communication protocol between the SCFs 3 and 6, the SDFs 4 and 7 and the SMF 8 can also be the same as the prior art i.e. the X25/ATM protocol with a modification to include the transmission of a marker such as a flag or version number to the local SCF 3 and/or local SDF 4.

This telecommunication network is based on the CCITT standard termed Capability Set 1 (CS-1) specified in the CCITT Q. 1200 series of recommendations.

The various methods of operating this embodiment will now be described with reference to FIGS. 3 to 9.

Figure 3A:
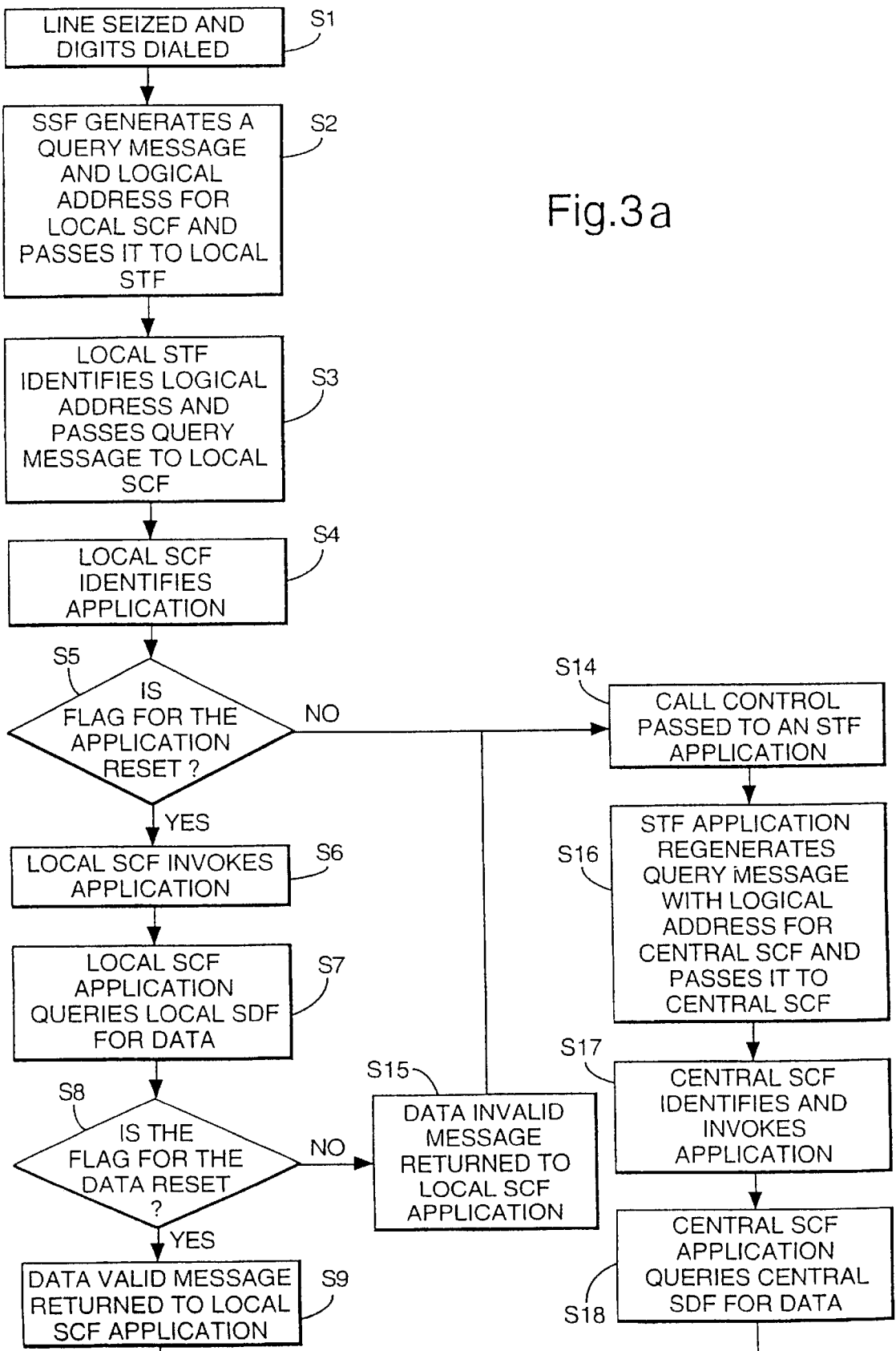
FIGS. 3*a* and 3*b* provide a flow diagram of a first switching control method using the first embodiment of the present invention.
Figure 3B:
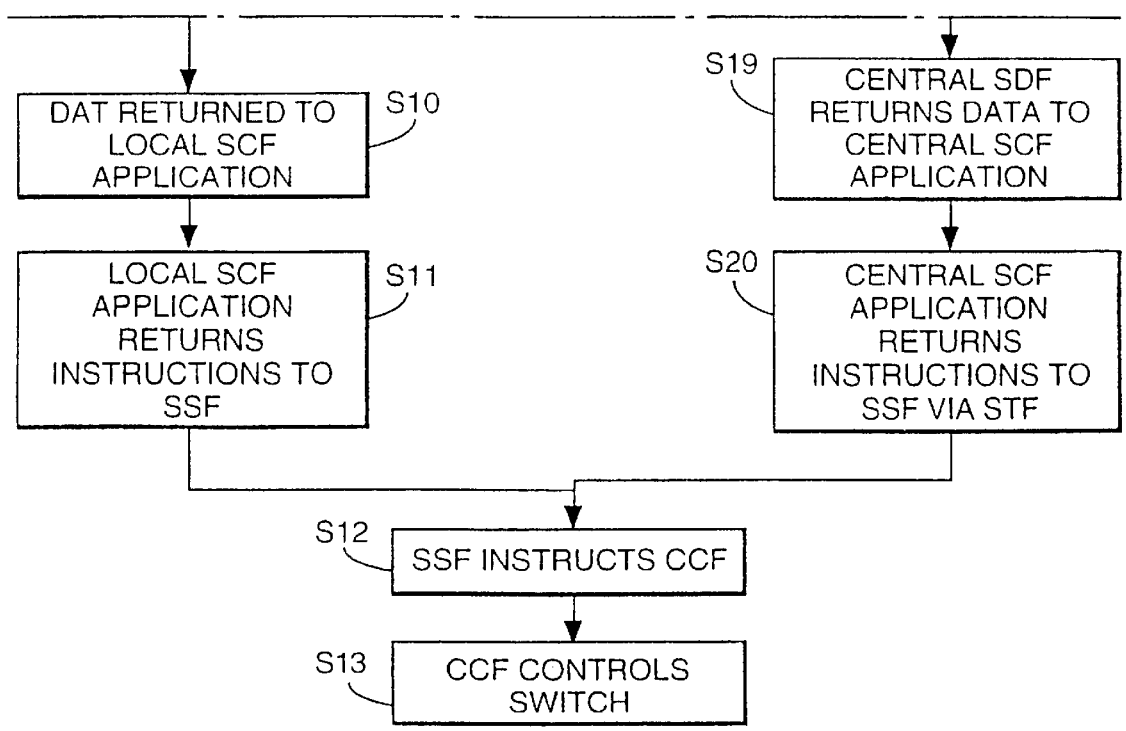
Figure 4:
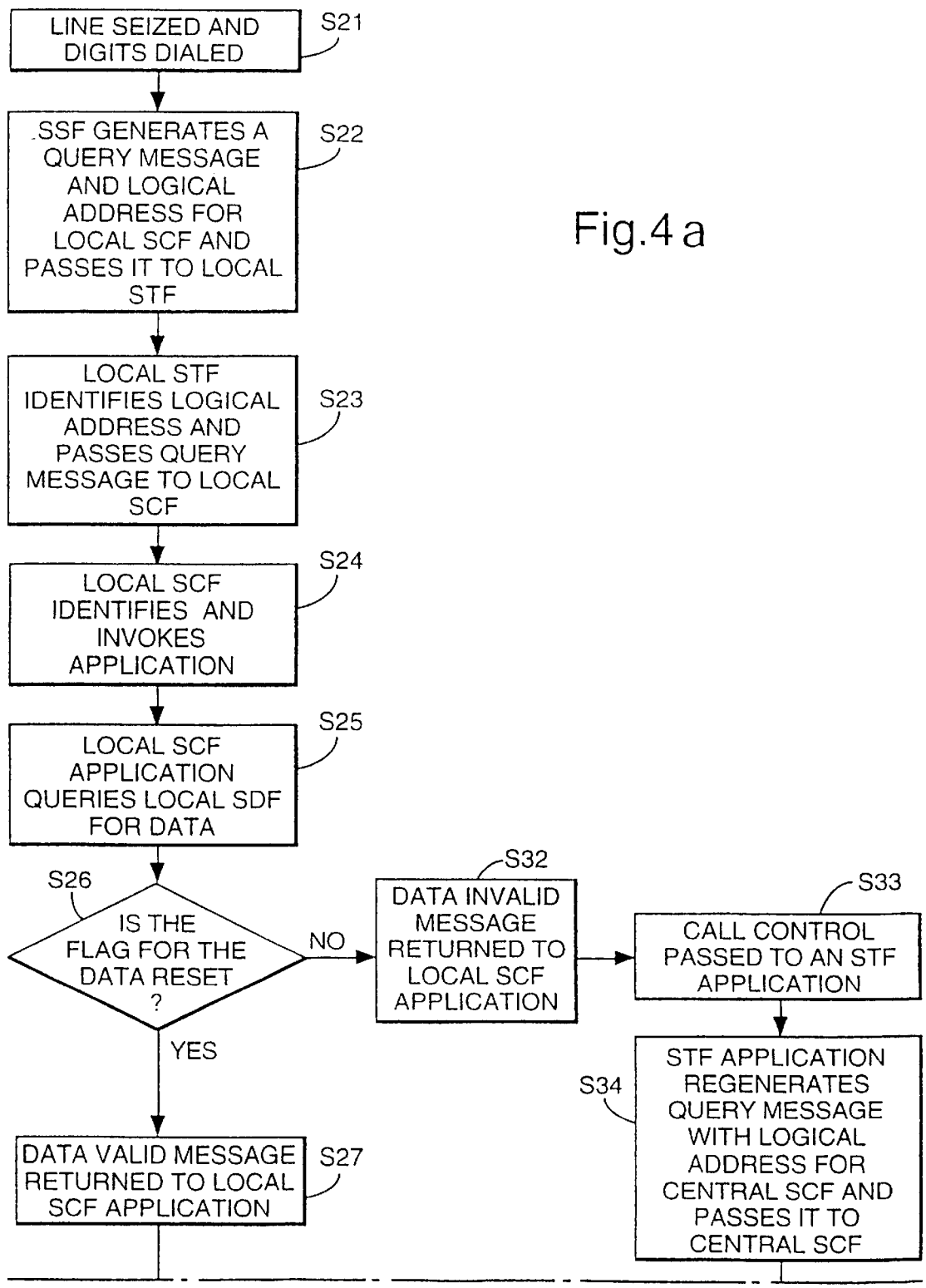
FIGS. 4*a* and 4*b* provide a flow diagram of a second switching control method using the first embodiment of the present invention.

FIGS. 3a and 3b illustrates one method of operating the telecommunication network illustrated in FIG. 2. In this method the local SCF 3 contains a flag for the application to be run and the local SDF contains a flag for the data required by the SCF application. When a telephone call is placed the line is seized and the digits are dialled in step S1. When the local exchange 1 receives the dialled digits, the SSF generates a query message and logical address for the local SCF 3 and passes it to the local STF 5 in step S2. The local STF identifies the logical address and passes the query message to the local SCF 3 in step S3. In step S4 the local SCF identifies the application which is to be run and in step S5 the flag or marker for the application is examined to determine if the flag is set or reset. If the flag is reset, the local SCF invokes the application in step S6 which is the subject of the query from the SSF. The local SCF application queries the local SDF 4 for data in step S7. The flag or marker for the data is then examined in step S8 and if this is reset a data valid message is returned to the local SCF application in step S9. The data is then returned to the local SCF application in step S10 and in step S11 the local SCF application returns instructions to the SSF in the local exchange 1. The SSF then instructs the CCF in step S12 and in step S13 the CCF controls the switch to form the required switching path.

If in step S5 it is determined that the flag for the application is set, i.e. the application is out of date, the call control is passed to an STF application in the local STF 5 in step S14. Similarly, if the flag for the data is determined to be set in step S8 indicating that the data is out of date, a data invalid message is returned to the local SCF application in step S15 and call control is passed to an STF application in step S14. The STF application then regenerates the query message with the logical address for the central SCF 6 and it is passed to the central SCF 6 in step S16. The central SCF 6 then identifies and invokes the required application in step S17 and in step S18 the central SCF application queries the central SDF 7 for data. The central SDF 7 then returns the data requested to the central SCF application in step S19 and in step S20 the central SCF application returns instructions to the SSF of the local exchange 1 via the local STF 5. The SSF then instructs the CCF in step S12 and the CCF controls the switch in step S13.

In this method, the flags for the application and the data are associated with the application and data respectively and if either one is set, indicating that either one is out of date, control is passed to the central SCF 6.

Referring now to FIGS. 4a and 4b, this flow diagram illustrates a second method of operating the telecommunication network illustrated in FIG. 2. In this method the local SDF 4 contains a flag for the data to be used by the SCF application. No flag for the application in the local SCF 3 is used in this method. When a telephone call is placed, the line is seized and the digits are dialled in step S21. When the local exchange 1 receives the dialled digits, the SSF generates a query message and the logical address for the local SCF 3 and passes it to the local STF 5 in step S22. The local STF 5 identifies the logical address and passes the query message to the local SCF 3 in step S23. In step S24 the local SCF 3 identifies and invokes the application to be run. Then the local SCF application queries the local SDF 4 for the data required by the application in step S25. The flag or marker for the data is then examined in step S26 and if this is reset a data valid message is returned to the local SCF application in step S27. The data is then returned to the local SCF application in step S28 and in step S29 the local SCF application returns instructions to the SSF in the local exchange 1. The SSF then instructs the CCF in step S30 and in step S31 the CCF controls the switch to form the required switching path.

If in step S26 it is determined that the flag for the data is determined to be set, indicating that the data is out of date, a data invalid message is returned to the local SCF application in step S32 and call control is passed to an STF application in step S33. The STF application then regenerates the query message with a logical address for the central SCF 6 and it is passed to the central SCF 6 in step S34. The central SCF 6 then identifies and invokes the required application in step S35 and in step S36 the central SCF application queries the central SDF 7 for data. The central SDF 7 then returns the data requested by the central SCF application in step S37 and in step S38 the central SCF application returns instructions to the SSF of the local exchange 1 via the local STF 5. The SSF then instructs the CCF in step S30 and the CCF controls the switching in step S31.

Figure 5A:
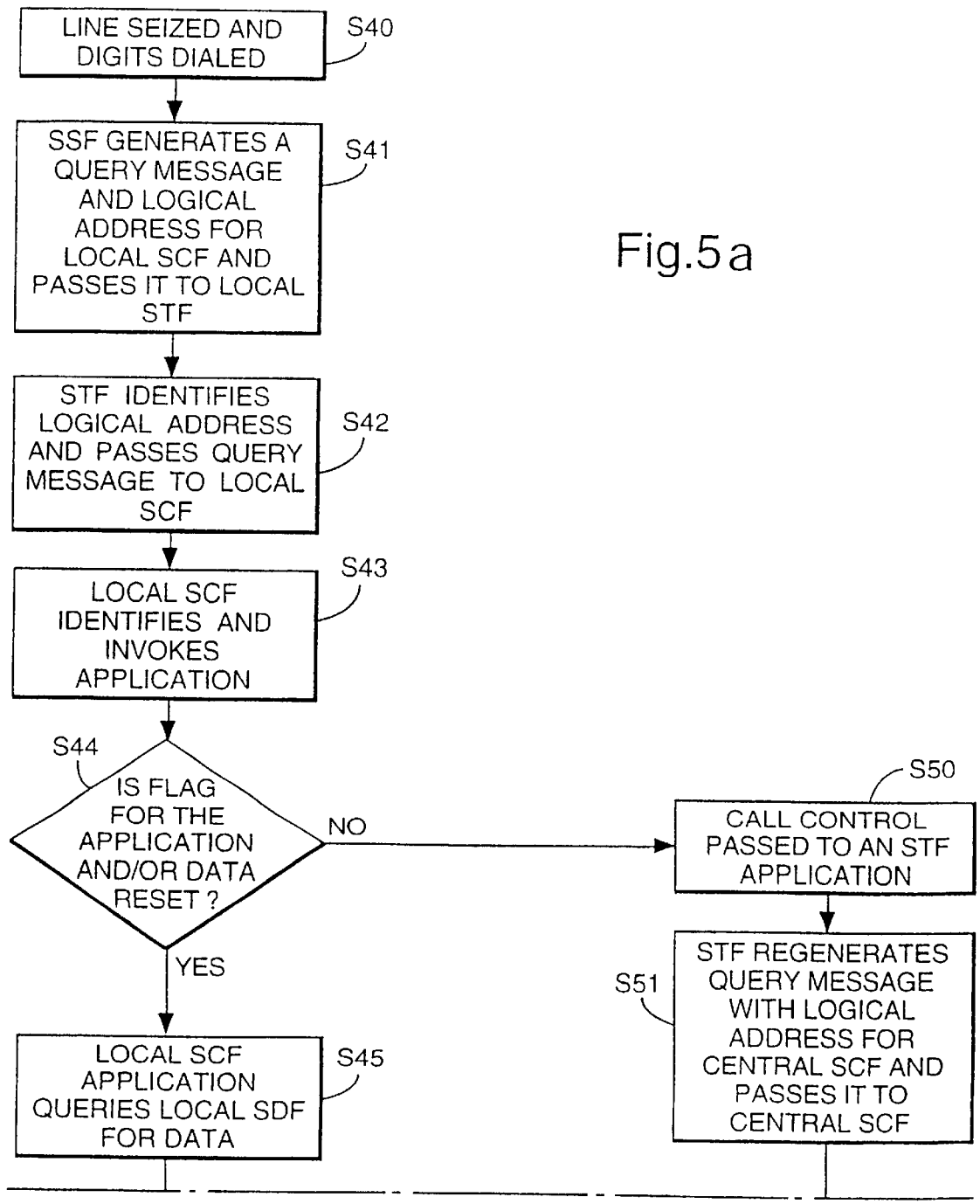
FIGS. 5*a* and 5*b* provide a flow diagram of a third switching control method using the first embodiment of the present invention.
Figure 5B:
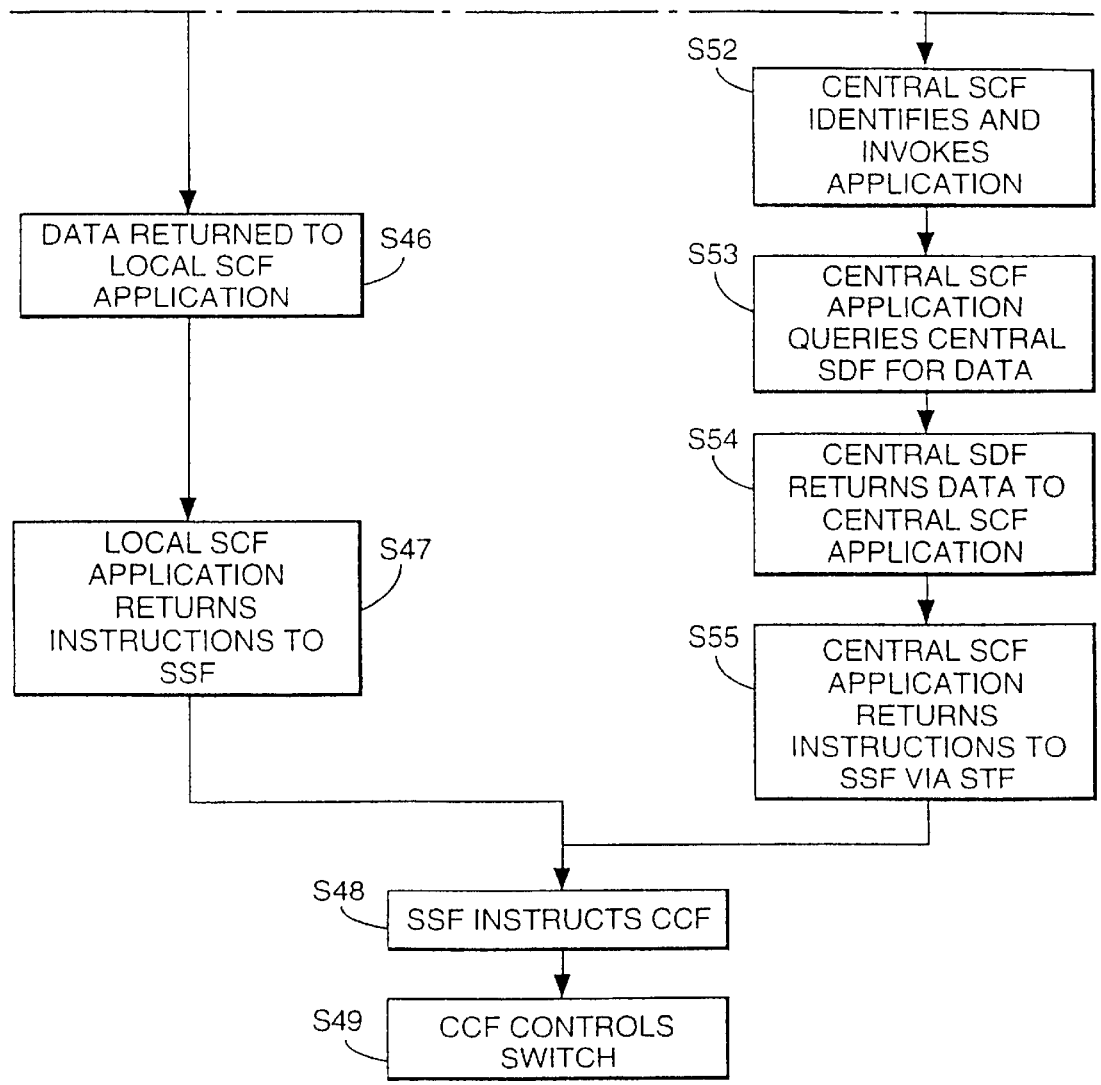

Referring now to FIGS. 5a and 5b, this flow diagram illustrates a third method of operating the telecommunication network illustrated in FIG. 2. In this method the local SCF 3 holds flags for both the SCF applications and the data held in the local SDF 4 which is required by the SCF applications. This method is applicable where the SCF application only uses one set of data i.e. the SCF application has dedicated data.

When a telephone call is placed, the line is seized and the digits are dialled in step S40. When the local exchange 1 receives the dialled digits, the SSF generates a query message and logical address for the local SCF 3 and passes it to the local STF 5 in step S41. The local STF identifies the logical address and passes the query message to the local SCF 3 in step S42. In step S43 the local SCF identifies and invokes the application which is to be run. In step S44 the flag or marker for the application and the data is examined to determine if the flag for the application or the data is set or reset. If either of the flags is reset, the local SCF application queries the local SDF 4 for data in step S45. The data is then returned to the local SCF application in step S46 and in step S47 the local SCF application returns instructions to the SSF in the local exchange 1. The SSF then instructs the CCF in step S48 and in step S49 the CCF controls the switch to form the required switching path.

If in step S44 it is determined that the flag for the application or the data is set, i.e. the application and/or data is out of date, the call control is passed to an STF application in the local STF 5 in step S50. The STF application then regenerates the query message with a logical address for the central SCF 6 and it is passed to the central SCF 6 in step S51. The central STF 6 then identifies and invokes the required application in step S52 and in step S53 the central SCF application queries the central SDF 7 for data. The central SDF 7 then returns the data requested to the central SCF application in step S54 and in step S55 the central SCF application returns instructions to the SSF of the local exchange 1 via the local STF 5. The SSF then instructs the CCF in step S48 and the CCF controls the switch in step S49.

Figure 6A:
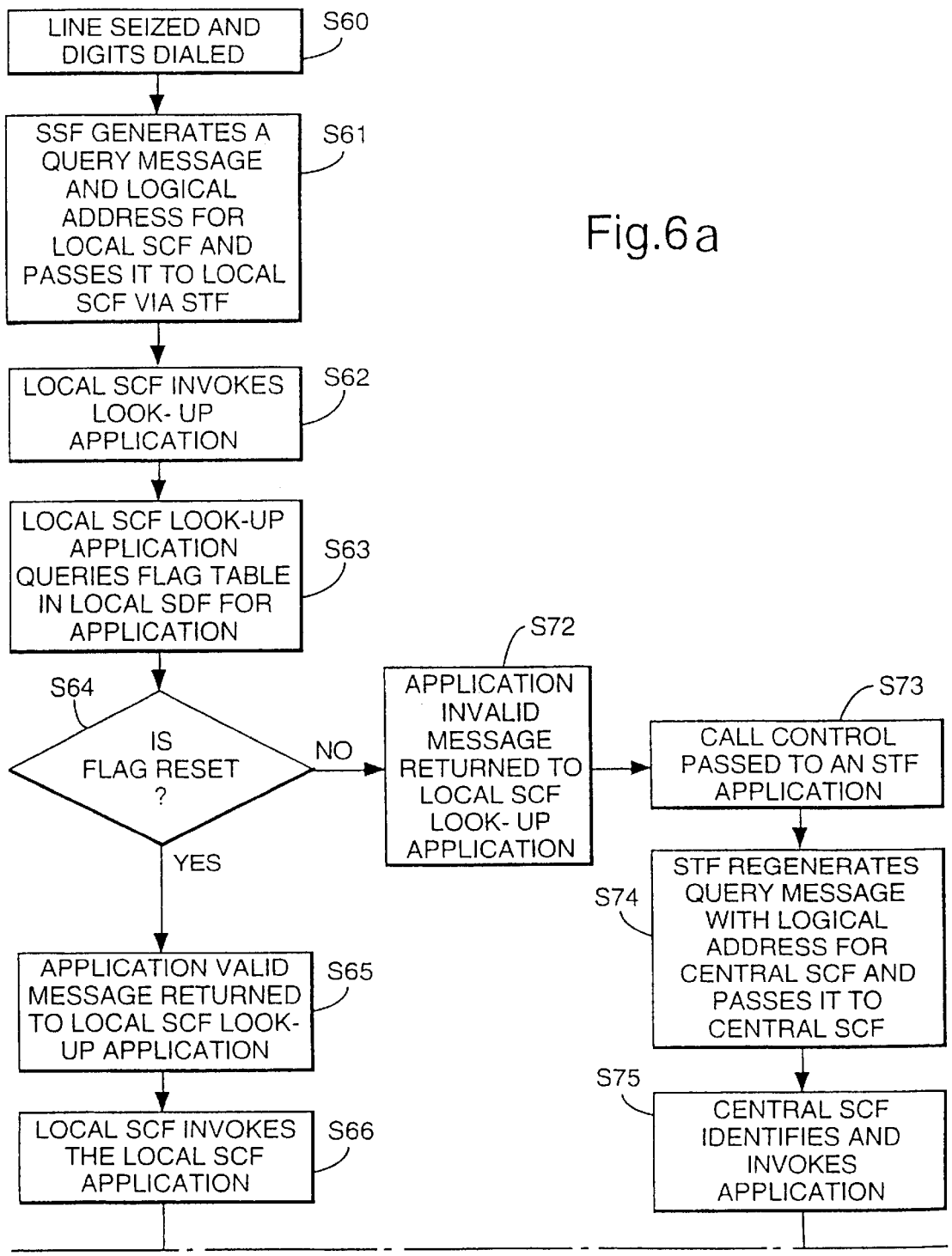

Referring now to FIGS. 6a and 6b, this flow diagram illustrates a fourth method of operating the telecommunication network illustrated in FIG. 2. In this method the local SDF 4 stores the flags for the applications run in the local SCF 3. In this method the flag for the applications can be stored in a look-up table. No flag for the data is used in this method.

When a telephone call is placed, the line is seized and the digits are dialled in step S60. When the local exchange 1 receives the dialled digits, the SSF generates a query message and a logical address for the local SCF 3 and passes it to the local SCF 3 via the STF 5. The SCF then invokes a look-up application in step S62 and in step S63 the local SCF look-up application queries the flag table in the local SDF to determine the status of the flag for the application to be run in the local SCF 3 to control the switch in the local exchange 1. In step S64 it is determined whether the flag in the flag table in the local SDF 4 is set or reset. If the flag is reset the local SCF 3 invokes the application which is the subject of the query from the SSF in step S66. The local SCF application queries the local SDF 4 for data in step S67. The data is then returned to the local SCF application in step S68 and in step S69 the local SCF application returns instructions to the SSF in the local exchange 1. The SSF then instructs the CCF in step S70 and in step S71 the CCF controls the switch to form the required switching path.

If in step S64 it is determined that the flag for the application is set, i.e. the application is out of date, an application invalid message is returned to the local SCF look-up application in step S72. The local SCF look-up application then passes the call control to an STF application in step S73. The STF application then regenerates the queried message from the logical address SCF 6 and it is passed to the central SCF 6 in step S74. The central SCF 6 then identifies and invokes the required application in step S75 and in S76 the central SCF application queries the central SDF 7 for data. The central SDF 7 then returns the data requested to the central SCF application in step S77 and in step S78 the central SCF application returns instructions to the SSF of the local exchange 1 via the local STF 5. The SSF then instructs the CCF in step S70 and the CCF controls the switch in step S71.

Figure 7A:
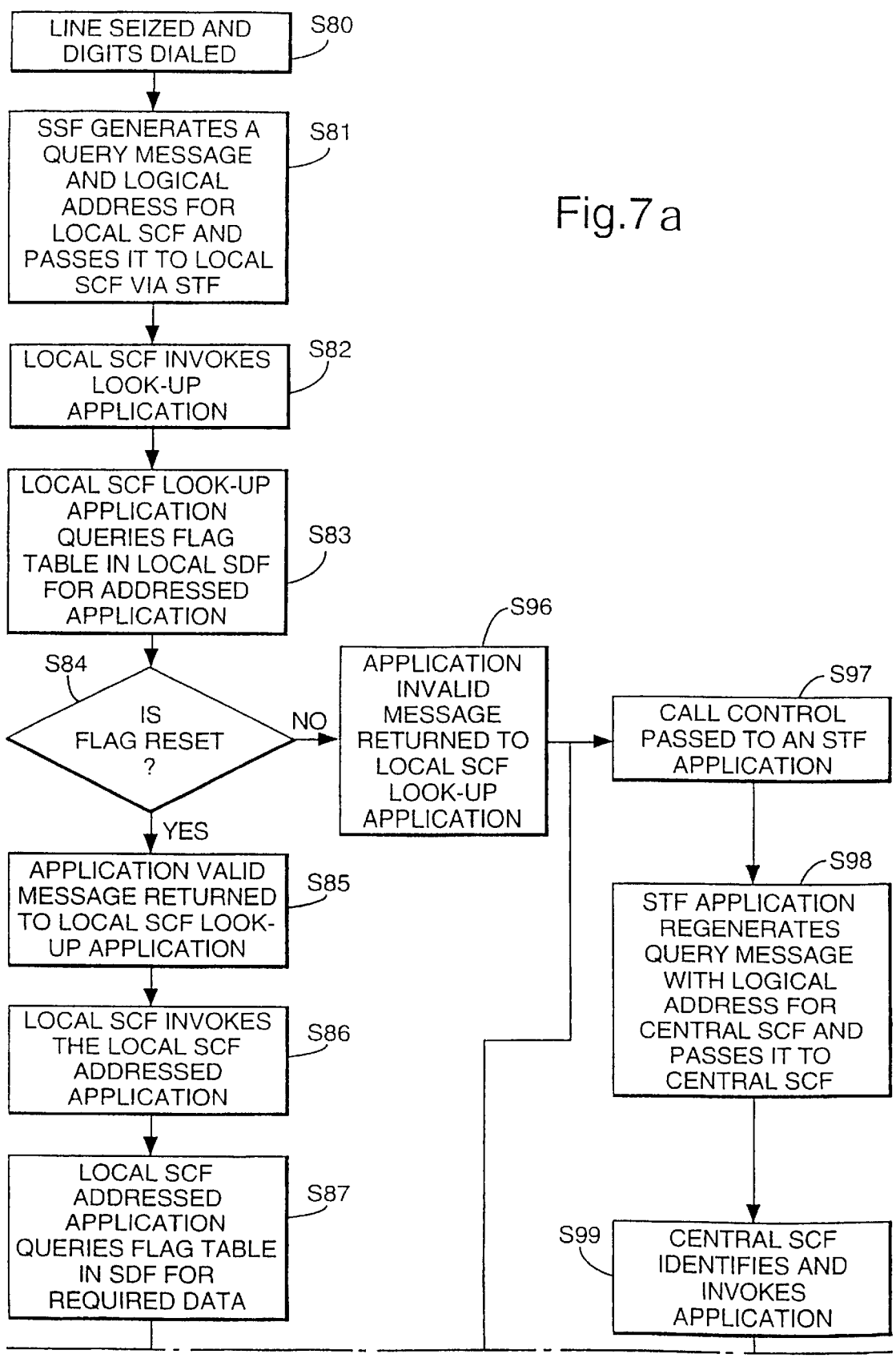
FIGS. 7a and 7b provide a flow diagram of a fifth switching control method using the first embodiment of the present invention.
Figure 7:
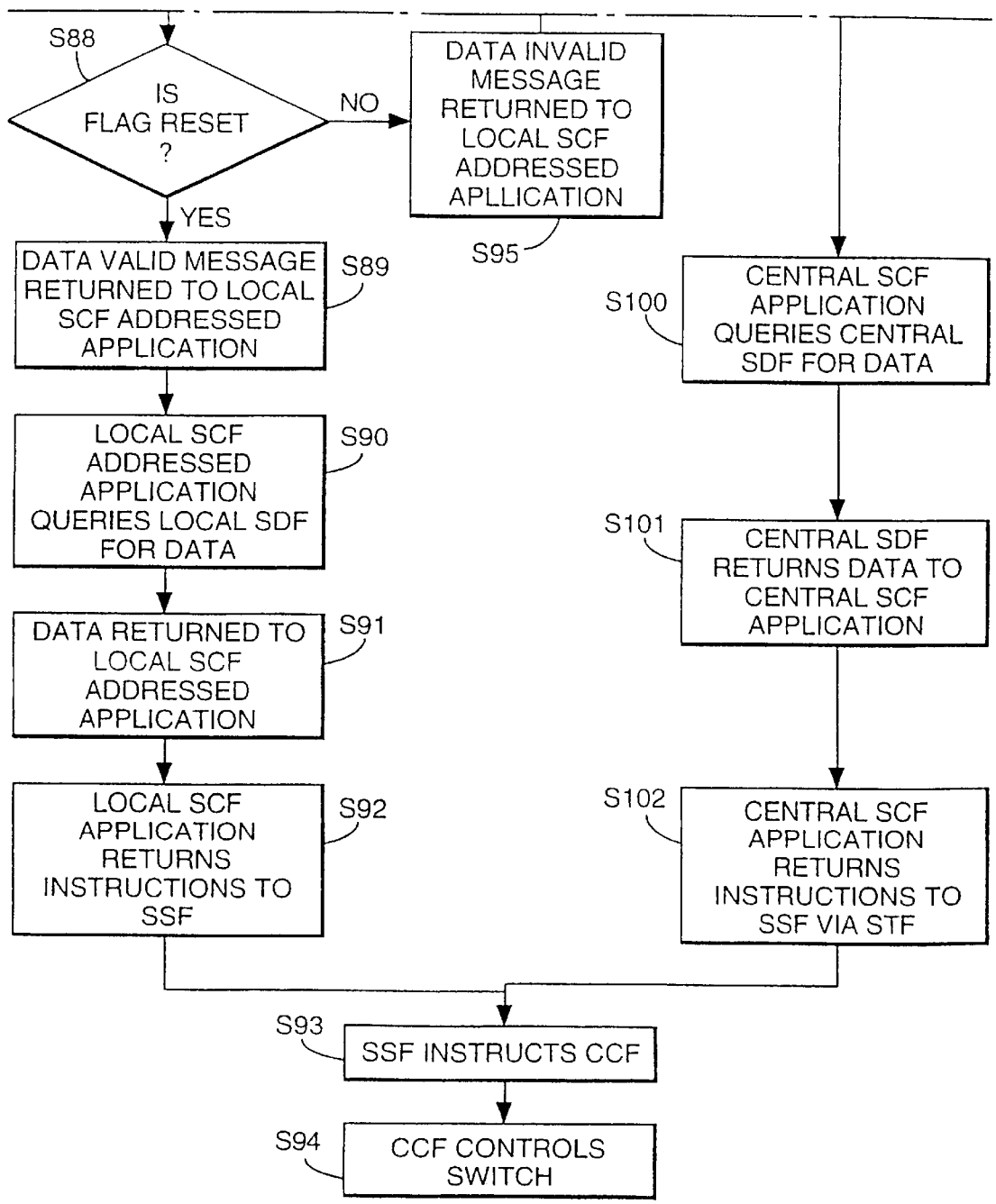

Referring now to FIGS. 7a and 7b, this flow diagram illustrates a fifth method of operating the telecommunication network illustrated in FIG. 2. In this method the local SDF 4 contains a table of flags for the local SCF applications and a table of flags for the data stored in the local SDF 4.

When a telephone call is placed, the line is seized and the digits are dialled in step S80. When the local exchange 1 receives the dialled digits, the SSF generates a query message and the logical address for the local SCF 3 and passes it to the local SCF via the STF in step S81. The local SCF 3 invokes a look-up application in step S82 and in step S83 the local SCF look-up application queries the flag table in the local SDF 4 for the addressed application which is the subject of the query from the SSF of the local exchange 1. In step S84 it is determined whether the flag for the application is set or reset. If the flag is reset, an application valid message is returned to the local SCF look-up application in step S85. In step S86 the local SCF 3 invokes the addressed application which is the subject of the query from the SSF. The local SCF application then queries the flag table in the local SDF 4 for the data required by the application in step S87. In step S88 it is determined whether the flag is set or reset. If the flag is reset, a data valid message is returned to the local SCF application and in step S90 the local SCF application queries the local SDF for data. The data is then returned to the local SCF application in step S91 and in step S92 the local SCF application returns instructions to the SSF in the local exchange 1. The SSF then instructs the CCF in step S93 and in step S94 the CCF controls the switch to form the required switching path. If in step S84 it is determined that the flag for the application is set, i.e. the application is out of date, an application invalid message is returned to the local SCF look-up application in step S96. The local SCF look-up application then passes the call control to an STF application in step S97. Similarly, if the flag for the data is determined to be set in step S88, indicating that the data is out of date, a data invalid message is returned to the local SCF application in step S95 and the local SCF application passes the call control to an STF application in step S97. The STF application then regenerates the query message with the logical address for the central SCF 6 and is passes to the central SCF 6 in step S98. The central SCF 6 then identifies and invokes the required application in step S99 and in step S100 the central SCF application queries the central SDF 7 for data. The central SDF 7 then returns the data requested to the central SCF application in step S101 and in step S102 the central SCF application returns instructions to the SSF of the local exchange 1 via the local STF 5. The SSF then instructs the CCF in step S93 and the CCF controls the switch in step S94.

Figure 8A:
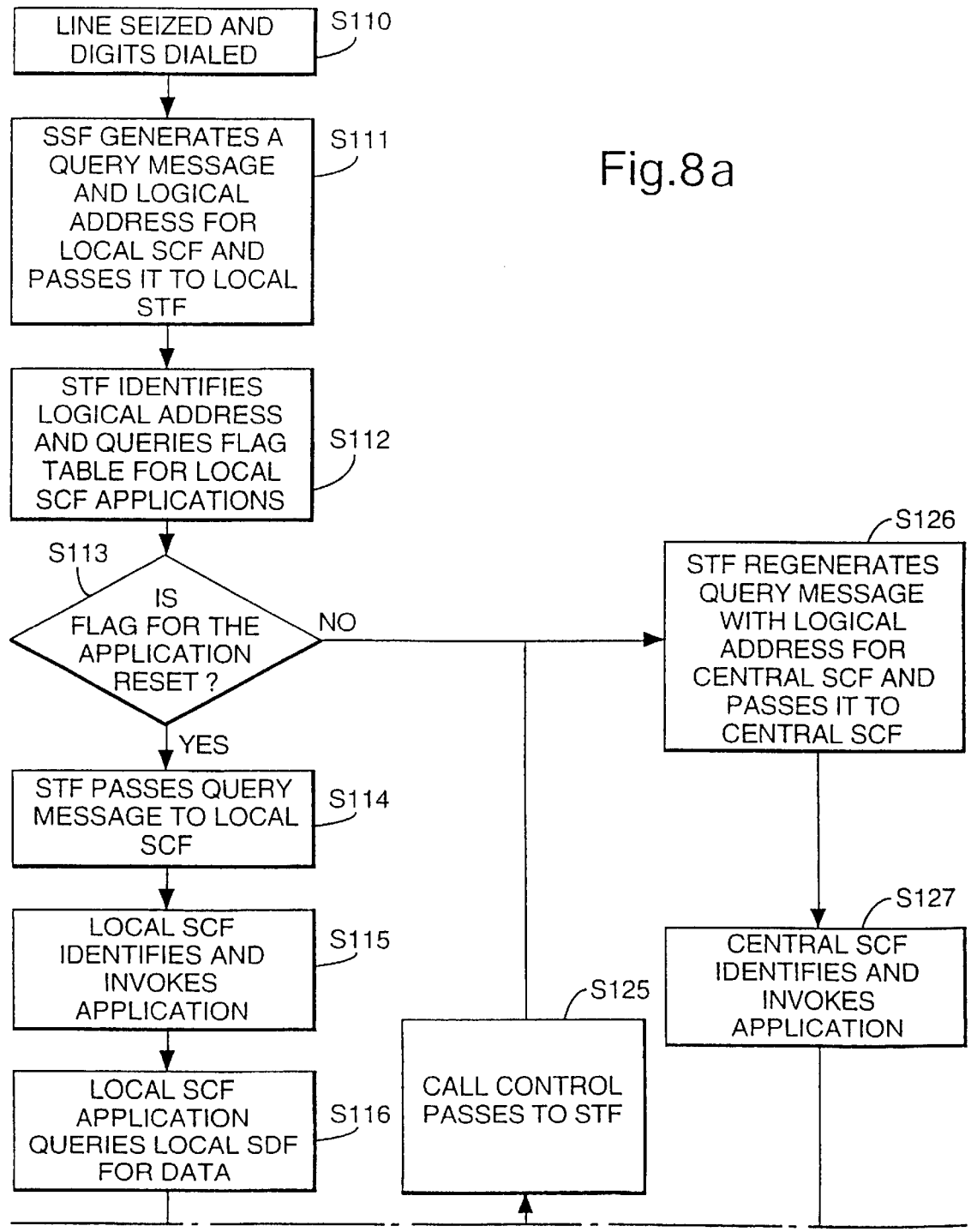
FIGS. 8a and 8b provide a flow diagram of a sixth switching control method using the first embodiment of the present invention.
Figure 8:
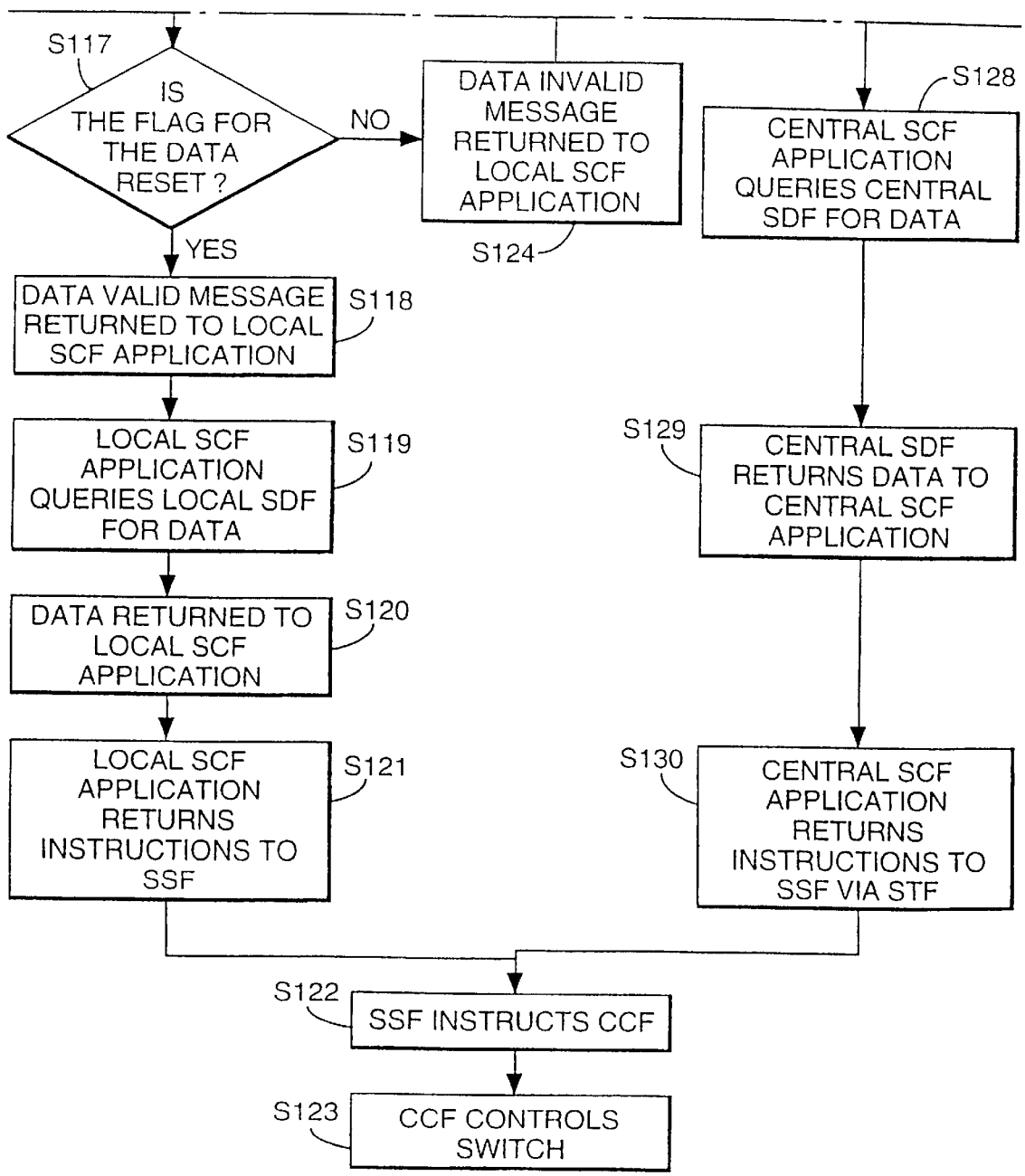

Referring now to FIGS. 8a and 8b, this flow diagram illustrates a sixth method of operating the telecommunication network illustrated in FIG. 2. In this method the STF 5 contains a table of flags for the applications to be run in the local SCF 3. The local SOF contains a table of flags for the data to be used by the applications run in the local SCF 3.

When a telephone call is placed, the line is seized and the digits are dialled in step S110. When the local exchange 1 receives the dialled digits, the SSF generates a query message and logical address from the local SCF 3 and passes it to the local STF 5 in step S111. The local STF identifies the logical address and queries the flag table contained in local STF 5 for the local SCF applications. In step S113 it is determined whether the flag for the application is set or reset. If the flag is reset, the local STF 5 passes the query message to the local SCF 3 in step S114. The local SCF 3 then identifies and invokes the application in step S115 and in step S116 the local SCF application queries the local SDF 4 for data. The flag or marker for the data in the table in the local SDF 4 is then examined in step S117 and if this is reset a data valid message is returned to the local SCF application in step S118. The data is then returned to the local SCF application and the local SCF application queries the local SDF 4 for the data in step S119. The data is then returned to the local SDF application in step S120 and in step S121 the local SCF application returns instructions to the SSF. The SSF then instructs the CCF in step S122 and in step S123 the CCF controls the switch to form the required switching path.

If in step S113 it is determined that the flag for the application is set, i.e. the application is out of date, the local STF 5 regenerates the query message with the logical address for the central SCF 6 and it is passed to the central SCF 6 in step S126. The central SCF 6 then identifies and invokes the application in step S127 and in step S128 the central SCF application queries the central SDF 7 for data. In step S129 the central SDF 7 returns the data to the central SCF application and in step S130 the central SCF application returns instructions to the SSF via the STF 5. The SSF then instructs the CCF in step S122 and the CCF controls the switch in step S123.

If in step S117 it is determined that the flag for the data is reset, a data invalid message is returned to the local SCF application in step S124. The local SCF 3 then passes the call control to the STF 5 in step S125. The STF 5 then regenerates the query message with logical address for the central SCF 6 and it is passed to the central SCF 6 in step S126. The central SCF 6 then identifies and invokes the application in step S127 and in step S128 the central SCF application queries the central SDF 7 for data. In step S129 the central SDF 7 then returns the data to the central SCF application and in step S130 the central SCF application returns instructions to the local SSF 3 via the STF 5. The SSF then instructs the CCF in step S122 and the CCF controls the switch in step S123.

Referring now to FIGS. 9A and 9B, these flow diagrams illustrate methods of modifying or updating the applications and/or data in the local SCFs and SDFs in the centralised telecommunication network illustrated in FIG. 2.

In FIG. 9A, the customer changes the application and/or data in the SMF 8 in step S200. The SMF 8 then updates the application and/or the data in the central SCF 6 and/or the central SDF 7 respectively. At the same time (or very shortly after the SMF 8 updates the central SCF 6 and/or the central SDF 7), the SMF 8 sends a set flag command to the local SCFs 3 and/or local SDFs 4 in step S202. In step S203 the local SCFs 3 and/or local SDFs 4 respond to the set flag command by identifying and setting the application and/or data flag respectively. Once the local SCFs 3 and/or local SDFs 4 have set the appropriate flag, they return a verification message to the SMF 8 in step S204. Thus, in this method the SMF 8 is able to update the central SCF 6 and/or the central SDF 7 with a new application or data as appropriate. The SMF is also then able to ensure that the updated application and/or data will be used to control the switch in the local exchange 2 by associating a mark with the application and/or data used in the local SCF 3 and/or local SDF 4 respectively to mark the application and/or data as out of date, then ensuring that the query from the SSF in the local exchange 2 is routed to the central SCF 6 which uses the central SDF 7.

FIG. 9B illustrates an alternative method of modifying the application in the local SCF 3 and the data in the local SDF 4 by transmitting signals via the central SCF 6. In step S210 the customer changes the application and/or data in the SMF 8. The SMF 8 then updates the central SCF 6 and/or the central SDF 7. The SMF 8 then generates a set flag command in step S211 which is sent in step S213 initially to the central SCF 6. In step S214 the central SCF 6 runs a management application which responds to the set flag command to generate an SCF to SCF message. This is then transmitted from the central SCF 6 to the local SCF 3. The local SCF 3 receives the SCF to SCF message in step S215 and sets the flag for the application and/or data in the local SCF 3 and/or local SDF 4 as appropriate. The local SCF 3 then returns a verification message in step S216 which is received by the central SCF 6 causing the central SCF management application to send a verification message to the SMF 8 in step S217.

Thus, FIG. 9B provides a method of setting flags in the local STF 5, the local SCF 3 or the local SDF 4 utilising the command network which is already in place between the central SCF 6 and the local exchange 1. Unlike the method of FIG. 9B, no direct command control lines are necessary between the local SCF 3, the local SDF 4 and the SMF 8.

When the control lines between the SMF 8 and the local SCFs 3 and the local SDFs 4 are not busy, the SMF 8 is able to update the applications in the local SCF 3 and the data in the local SDF 4 and reset the appropriate flags. This process can take place non-real time. While the applications in the local SCF 3 and the data in the local SDF 4 are out of date, the SSF of the local exchange 1 will refer to the central SCF 6 and the central SDF 7 for instructions. Thus, in a large network wherein a central SCF 6 controls many local exchanges 1, whilst the SMF 8 is updating all of the applications and data in the local SCFs 3 and local SDFs 4 respectively, some local exchanges will be using the central SCF 6 and central SDF 7 whilst others will be using their respective local SCF 3 and local SDF 4 depending upon the state of updating.

Figure 10:
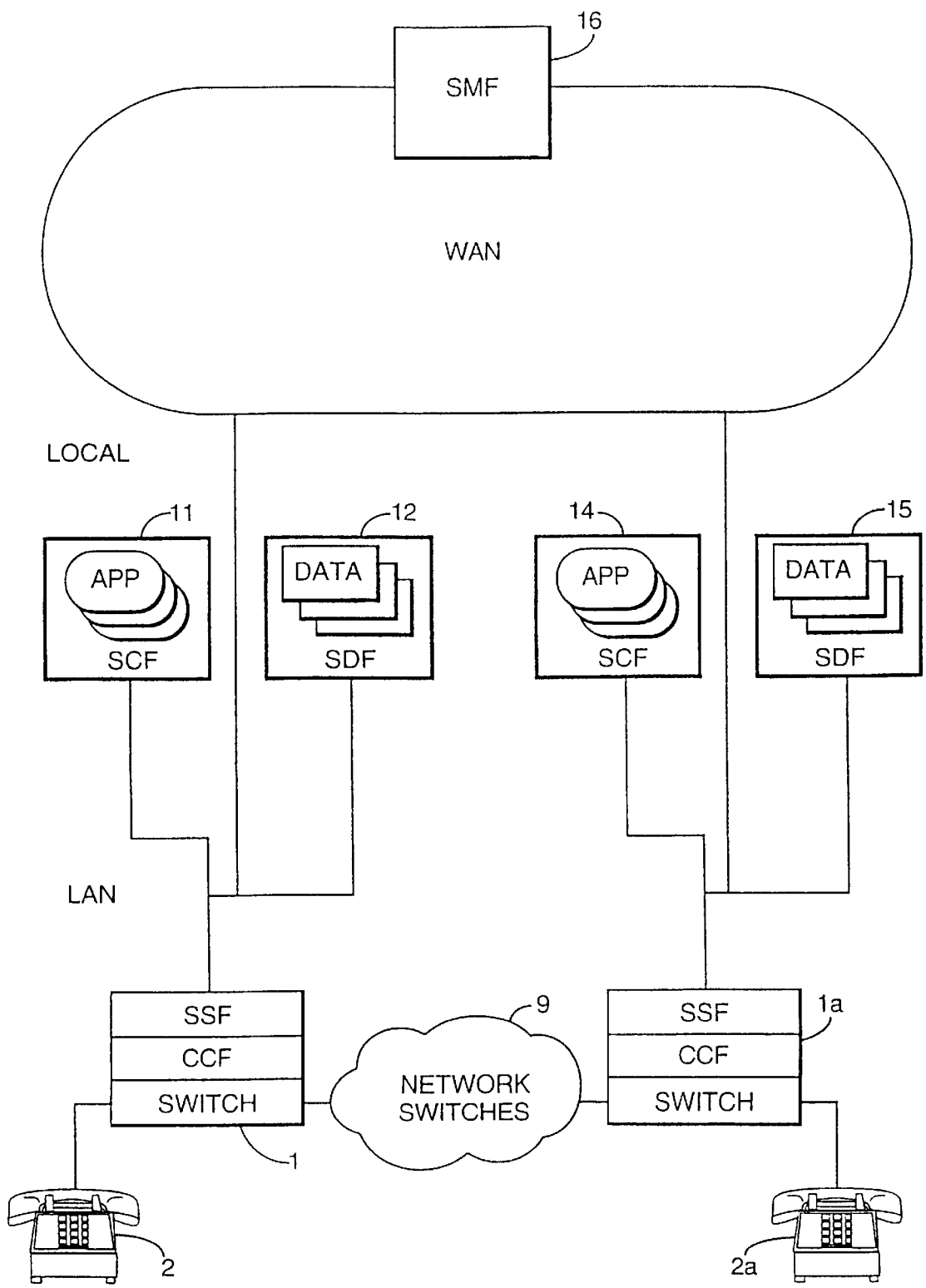
FIG. 10 is a schematic illustration of a distributed telecommunication network in accordance with a second embodiment of the present invention.

FIG. 10 illustrates a second embodiment of the present invention which represents a distributed local processing environment. This arrangement differs to the first embodiment in that there are no central SCFs or SDFs provided. Instead a plurality of local SCFs and local SDFs are provided each associated with a local exchange. This system operates on the principle that if the local exchange cannot locate up to date applications or data in the local SCF or SDF respectively, instead of referring to a central SCF or central SDF, another local SCF and SDF is referred to.

In FIG. 10, a telecommunication signal from telephone 2 is received in a local exchange 1 for switching onto a network of switches 9. In the local exchange 1, the switch is controlled by a CCF which is instructed by a SSF. The SSF is connected over a local area network (LAN) to a local SCF 11 and a local SDF 12. A further local exchange 1a connected to a further telephone 2 is connected over a LAN to a further local SCF 14 and a further local SDF 15. The LAN's of the two local exchanges 1 and 1a are connected together by a wide area network (WAN). Also connected to the WAN is an SMF 16 for performing management functions in the distributed network.

In this arrangement the SMF 16 is able to communicate with the local SCFs 11 and 14, and the local SDFs 12 and 15. Each of the local SCFs 11 and 14 is able to reroute a query from a local exchange 1 or 1a to another local SCF 10 and 13 over the LAN and WAN in order to ensure that the local exchange is controlled by the up to date application and/or data. The SMF 16 is able to transmit updates to the applications and/or data using file transfer protocol (FTP) using ATM (asynchronous transfer mode) over the WAN, and TCP/IP (transmission control protocol/internet protocol) (an ethernet protocol) over the LAN. Over the LAN the ethernet messaging protocol can be used to provide a transmission speed of 10 MBits per second or alternatively the FDDI (fibre distribution data interface) messaging protocol can be used to provide a transmission speed of 100 MBits per second.

The various methods of operating this embodiment will now be described with reference to FIGS. 11 to 14.

Figure 11A:
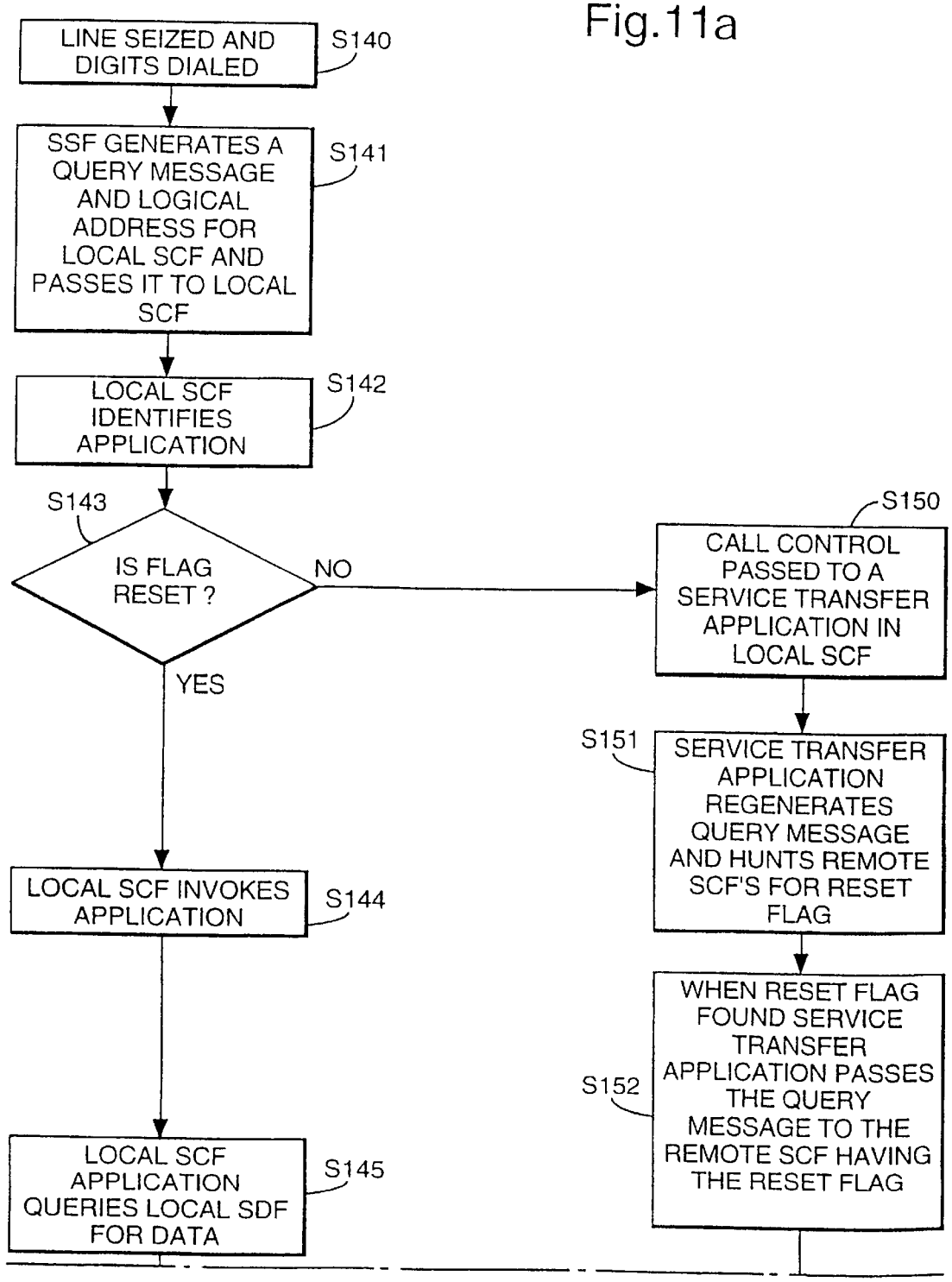
FIGS. 11a and 11b provide a flow diagram of a first switching control method using the second embodiment of the present invention.
Figure 11B:
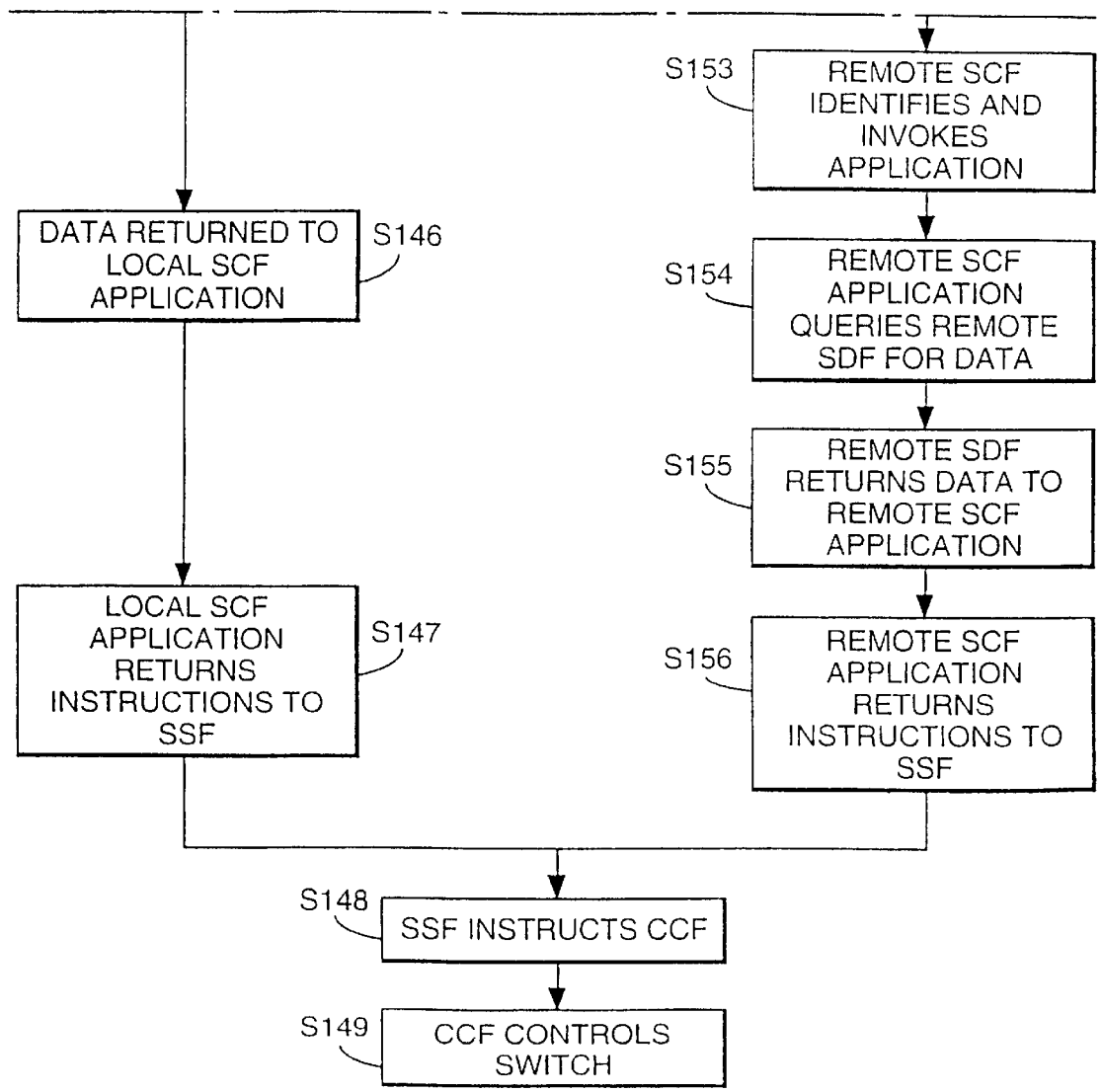

FIGS. 11a and 11b illustrate a first method of operating the distributed telecommunication network illustrated in FIG. 10. When a telephone call is placed, the line is seized and the digits are dialled in step S140. When the local exchange 1 receives the dialled digits, the SSF generates a query message and logical address for the local SCF 11 and passes it to the local SCF 11 in step S141. The local SCF 10 identifies the application in step S142 and in step S143 it is determined whether the flag for the application for the application is set or reset. If it is reset, in step S144 the local SCF 11 invokes the application and in step S145 the local SCF application queries the local SDF 12 for the requisite data. The local SDF 12 returns the data to the local SCF application in step S146 and in step S147 the local SCF application returns instructions to the SSF. The SSF then instructs the CCF in step S148 and the CCF control the switch in step S149.

If in step S143 it is determined that the flag for the application is reset, the call control is passed to an service transfer application in the local SCF 11 in step S150. The service transfer application then regenerates the query message and hunts in the remote local SCFs for a reset flag in step S151. When a reset flag is found in step S152 the local SCF 11 service transfer application passes the query message to the remote local SCF 14 having the reset flag. The remote local SCF 14 then identifies and invokes the application in step S153 and the remote local SCF application queries the remote local SDF 15 for the requisite data in step S154. The remote local SDF 15 then returns the requisite data to the remote local SCF application in step S155. The remote local SCF application then returns instructions to the SSF over the WAN in step S156. The SSF then instructs the CCF in step S148 and the CCF controls the switch in step S149.

In this first method of controlling the network of FIG. 10, the flag for the applications are held in the local SCFs 11 and 14. No flags are held for the data.

Figure 12A:
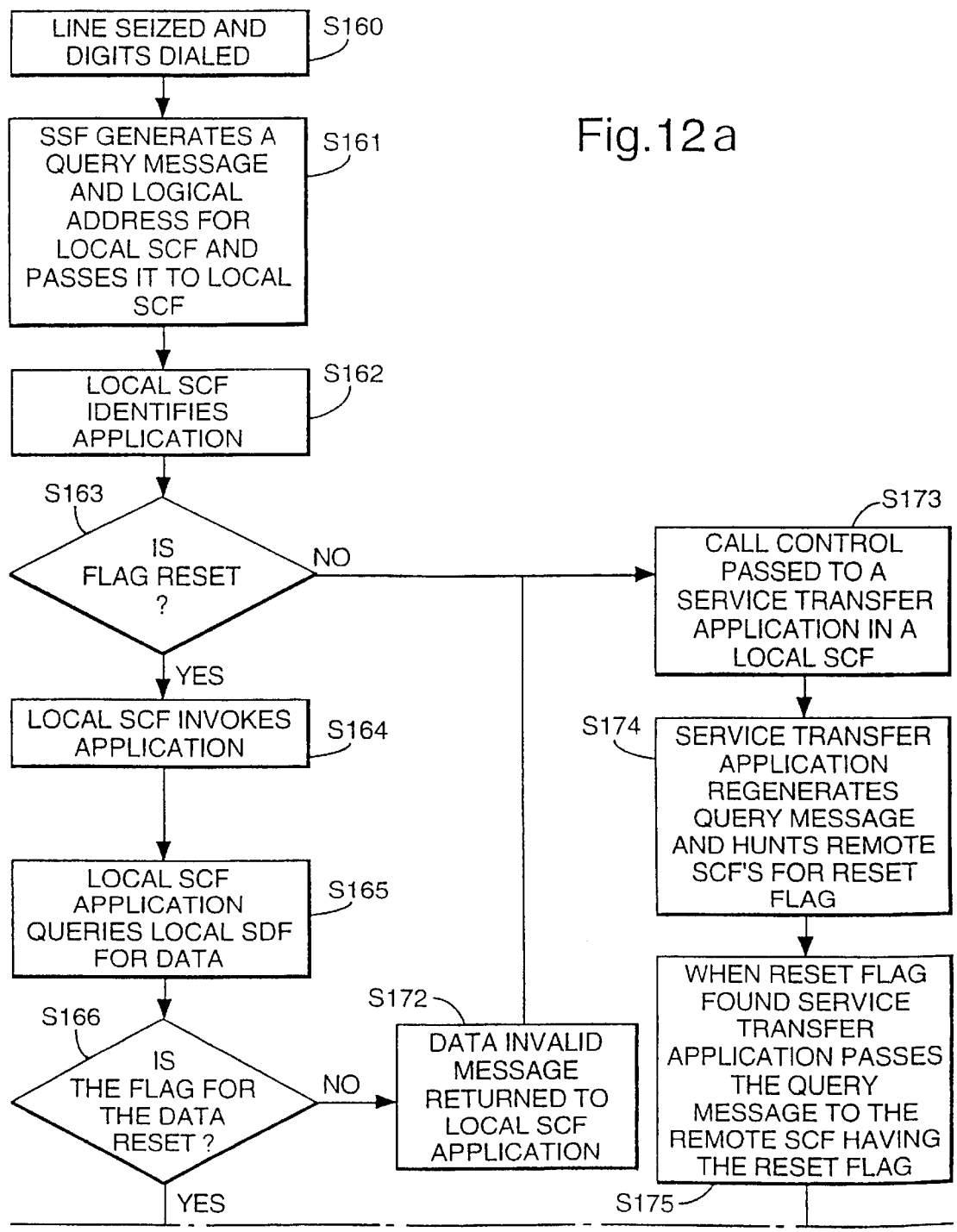
FIGS. 12a and 12b provide a flow diagram of a second switching control method using the second embodiment of the present invention.

Referring now to FIGS. 12a and 12b, this flow diagram illustrates a second method of operating the telecommunication network illustrated in FIG. 10. In this method the local SCFs 11 and 14 hold the flags for the applications and the local SDFs 12 and hold the flags for the data.

Figure 12:
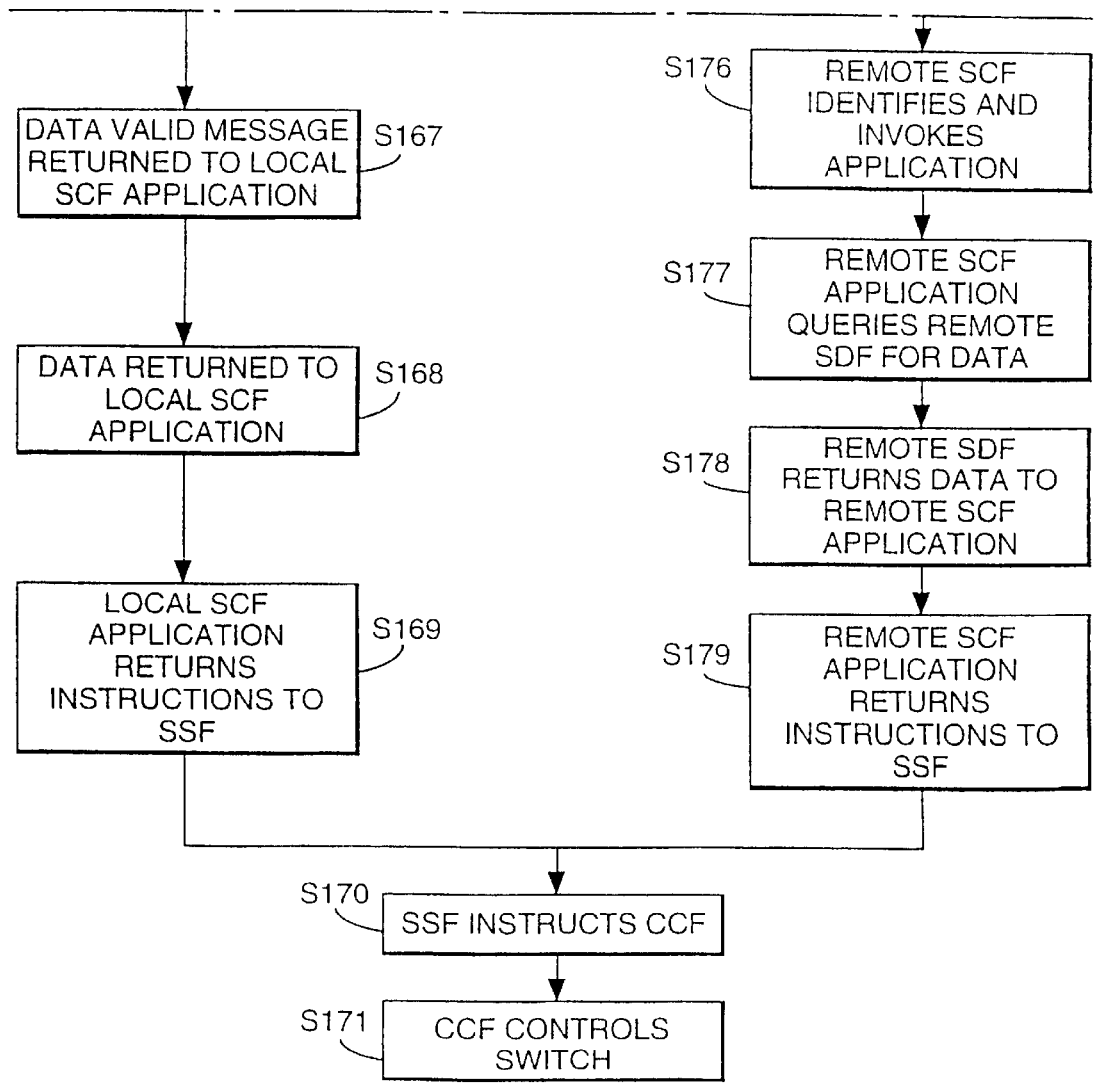

Referring now to FIG. 12, when a telephone call is placed, the line is seized and the digits are dialled in step S160. When the local exchange 1 receives the dialled digits, the SSF generates a query message and logical address for the local SCF 11 and passes it to the local SCF 11 in step S161. The local SCF 11 then identifies the application which is to be run in step S162 and in step S163 the flag or marker for the application is examined to determine if the flag or marker is set or reset. If the flag is reset, the local SCF 11 invokes the application which is the subject of the query from the SSF in step S164. The local SCF application queries the local SDF 12 for data in step S165. The flag or marker for the data is then examined in step S166 and if this is reset a data valid message is returned to the local SCF application in step S167. The data is then returned to the local SCF application in step S168 and in step S169 the local SCF application returns instructions to the SSF in the local exchange 1. The SSF then instructs the CCF in step S170 and in step S171 the CCF controls the switch to form the required switching paths.

If in step S163 it is determined that the flag of the application is set, i.e. the application is out of date, the call control is passed to a service transfer application in the local SCF 11 in step S173. Similarly, if the flag for the data is determined to be set in step S166, indicating that the data is out of date, a data invalid message is returned to the local SCF application in step S172 and call control is passed to a service transfer application in the local SCF 11 in step S173. The service transfer application then regenerates the query message and hunts the remote local SCFs 14 for a reset flag for the application in step S174. In step S175 when a reset flag for the application is found the service transfer application passes the query message to the remote local SCF 14 having the reset flag. The remote local SCF 14 then identifies and invokes the application in step S176. The remote local SCF 15 application then queries the remote local SDF 15 for the requisite data in step S177 and the remote local SDF returns the data. to the remote local SCF application in step S178. In step S179 the remote local SCF application then returns instructions to the SSF of the local exchange 1. The SSF then instructs the CCF in step S170 and the CCF control the switch in step S171.

Figure 13B:
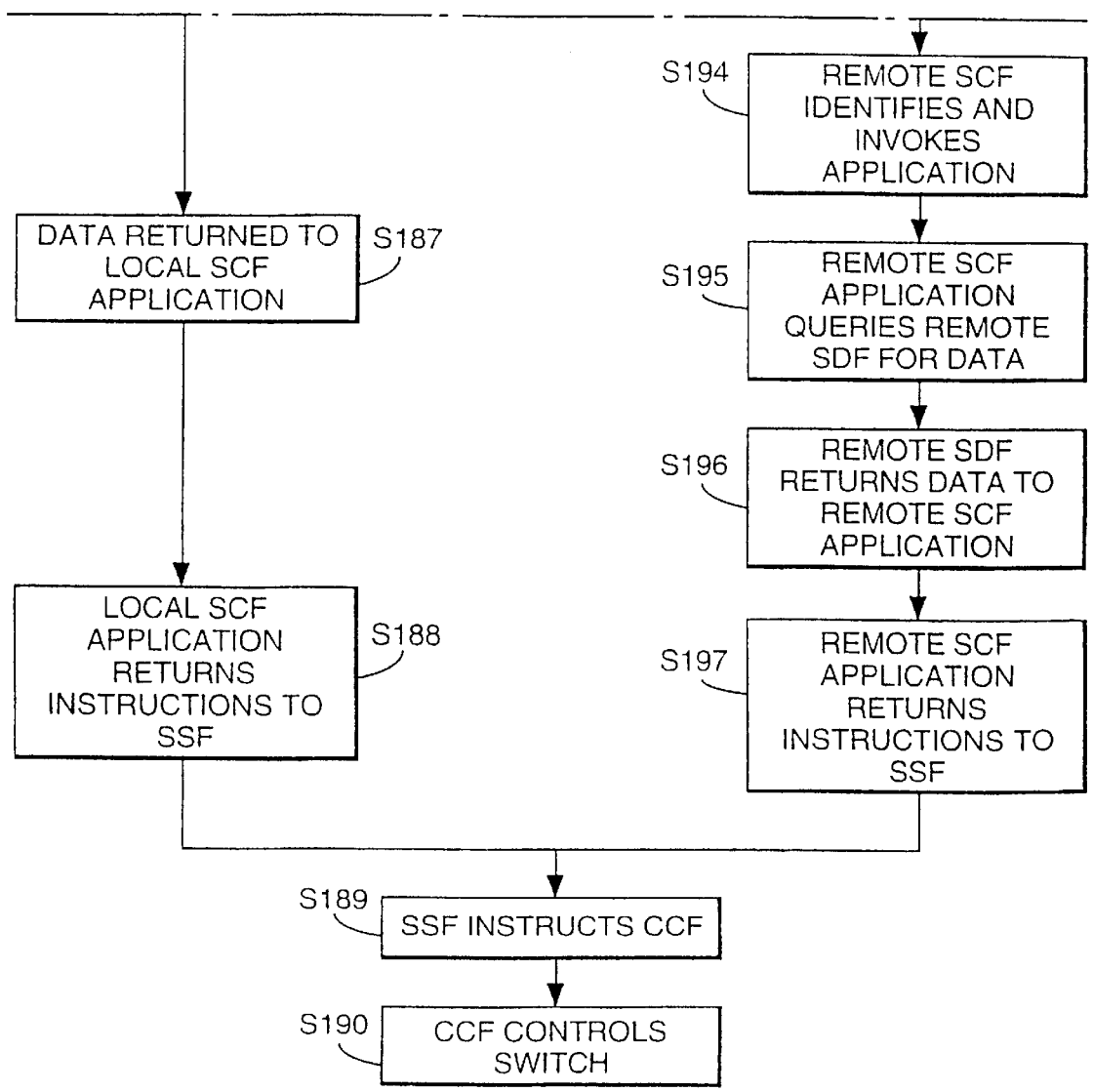

Referring now to FIGS. 13a and 13b, this flow diagram illustrates a third method of operating the telecommunication network illustrated in FIG. 10. In this method instead of using flags, the applications in the local SCFs 11 and 14 are marked with version numbers. When one of the local SCFs 11 or 14 is updated, the SMF 16, in addition to sending the updated application to the local SCF 11 or 14 also sends a version number to the SSF in the local exchange 1.

Thus referring to FIG. 13, when a telephone call is placed, the line is seized and the digits are dialled in step S180.

When the local exchange 1 receives the dialled digits, the SSF generates a query message and logical address for the local SCF 11 and sends with this message and address the latest version number of the application to be invoked in step S181. In step S182 the local SCF 11 identifies the application and in step S183 the version number for the application is compared with the version number transmitted from the SSF. In step S184 it is determined if the version number of the application in the local SCF 11 is the latest version. If it is the local SCF 11 then invokes the application in step S185 and the local SCF application then queries the local SDF 12 for the requisite data in step S186. Data is then returned to the local SCF application in step S187 and the local SCF application returns instructions to the SSF in step S188. The SSF then instructs the CCF in step S189 and the CCF controls the switch in step S190.

If however in step S184 it is determined that the version number of the application in the local SCF 11 is not the latest version number, call control is passed to an service transfer application in the local SCF 11 in step S191. The service transfer application then regenerates the query message and hunts the remote local SCFs for the latest version umber in step S192. When the latest version number is found in a remote local SCF 14, the service transfer application passes the query message to the remote local SCF 14 which has the latest version number for the application which is the subject of the query from the SSF of the local exchange 1 in step S193. In step S194 the remote local SCF 14 then identifies and invokes the application and the remote local SCF application queries the remote local SDF 15 for the requisite data in step S195. In step S196 the remote local SDF 15 returns the data to the remote local SCF application and the remote local SCF application returns instructions to the SSF of the local exchange 2 in step S197. The SSF then instructs the CCF in step S189 and the CCF controls the switch in step S190.

Referring now to FIG. 14, this flow diagram illustrates a method of updating the applications and data in the local SCFs 11 and 14 and local SDFs 12 and 15 respectively. In step S220 the customer changes the application and/or data in the SMF 16. The SMF 16 then updates a selected local SCF and/or SDF in step S221. The SMF 16 then sends a set flag command to the rest of the local SCFs and/or SDFs in step S222. The local SCFs and/or SDFs identify and set the flag for the application and/or data as appropriate in step S223. The local SCFs and/or SDFs then return a verification message to the SMF in step S224.

Thus in this method of updating the local SCFs and local SDFs in the distributed network, one local SCF and/or SDF is updated initially and the others are updated by the SMF at a later date when traffic over the WAN allows. An alternative method of performing the update would be to include a management application in each local SCF such that once it had received an update from the SMF 16, the management application then proceeded to send updated information to one or more others of the local SCFs. This option reduces the central processing requirements but increases the local processing requirements.

Also, in this distributed network, an alternative method of marking the application and/or data would be to not only mark the application and/or data as being out of date but also provide a pointer as to where the updated application and/or data can be found in the distributed network i.e. the address of the updated SCF and/or SDF. This method removes the requirement to hunt through the network to locate the updated SCF and/or SDF.

In the distributed network, as for the centralised network embodiment, the markers for the applications and/or data can be stored in the local SCF, or the local SDF. Also, the markers can comprise simple flags, version numbers, or for applications or data the address of the applications or data which is out of date can be deleted from a local SCF or SDF respectively. Any combination of these markers can be used for the applications and data in both the centralised and distributed network embodiments.

Further, although the embodiments of the present invention have been described with reference to the CS-1 standard, the present invention is not limited to this standard and is applicable to any intelligent telecommunication network.

Although specific embodiments have been described hereinabove with reference to the drawings, the present invention is not limited to these embodiments and modifications which fall within the scope of the present invention will be clear to a skilled person in the art.

What is claimed is:

1. A telecommunication network comprising:
   local switch means for receiving and switching a telecommunication signal to remote switch means in the network;
   local control means including storage means for storing instructions and/or data, said local control means being adapted to use said stored instructions and/or data to control the switching operation of said local switch means;
   remote control means including storage means for storing instructions and/or data equivalent to the instructions and/or data stored in said storage means of said local control means, said remote control means being adapted to control the switching operation of said local switch means, said local switch means being controlled by either said local control means or said remote control means;
   management means for modifying said instructions and/or data of said storage means of said local and remote control means, said management means being adapted to modify said instructions and/or data of said storage means of one of said local and remote control means immediately, to associate a marker with said instructions and/or data in said storage means of said local control means to indicate whether said storage means of said local control means contains the most recently modified instructions and/or data, and to similarly modify said instructions and/or data of said storage means of the others of said local and remote control means subsequently;
   said switching means being adapted to request control from said local control means;
   marker checking means for checking said marker to determine if said instructions and/or data in said storage means of said local control means are the most recently modified instructions and/or data; and
   passing means responsive to said marker means for passing the control request from said local switch means to said remote control means if said marker checking means determines that said instructions and/or data are not the most recently modified instructions and/or data.

2. A telecommunication network as claimed in claim 1 wherein said remote control means comprises central control means adapted to control the switching of a plurality of said local switch means.

3. A telecommunication network as claimed in claim 2 wherein said management means is adapted to modify said instructions and/or data of said storage means of said central control means immediately, to associate said marker with said instructions and/or data in said storage means of said local control means, and to subsequently similarly modify said instructions and/or data of said storage means of said local control means and reset said marker.

4. A telecommunication network as claimed in claim 3 wherein said management means directly communicates with both said local and central control means.

5. A telecommunication network as claimed in claim 3 wherein said management means directly communicates with said central control means, and communicates with said local control means via said central control means.

6. A telecommunication network as claimed in claim 1 wherein said central control means comprises central service data means for storing said data, and central service control means for storing and implementing said instructions with reference to said data in said control service data means.

7. A telecommunication network as claimed in claim 6 wherein said local control means comprises local service data means for storing said data, and local service control means for storing and implementing said instructions with reference to said data in said local service data means.

8. A telecommunication network as claimed in claim 7 wherein said passing means comprises signalling transfer means for receiving and routing said control request to said local or central service control means.

9. A telecommunication network as claimed in claim 7 wherein said central and local service control means each contain a plurality of sets of instructions, said marker being associated with each set of instructions in said local service control means; said central and local service data means each contain a plurality of sets of data, a said marker being associated with each set of data in said local service data means.

10. A telecommunication network as claimed in claim 9 wherein said local service control means is adapted to store said markers for said sets of instructions.

11. A telecommunication network as claimed in claim 9 wherein said signalling transfer means is adapted to store said markers for said sets of instructions.

12. A telecommunication network as claimed in claim 10 wherein said local service data means is adapted to store said markers for said sets of data.

13. A telecommunication network as claimed in claim 9 wherein said local service data means is adapted to store said markers for both said sets of instructions and said sets of data.

14. A telecommunication network as claimed in claim 13 wherein if said marker checking means determines that said local service control means contains the most recently modified instructions, said local service control means is adapted to receive said control request from said switch means, to initiate the implementation of said instructions by requesting data from said local service data means, and if said marker checking means determines that said data is the most recently modified data, to implement said instructions and control said local switch means, or if said marker checking means determines that said data is not the most recently modified data, to return said control request to said signalling transfer means for passage of said control request to said central service control means.

15. A telecommunication network as claimed in claim 14 wherein if said marker checking means determines that said local service control means does not contain the most recently modified instructions, said signalling transfer means is adapted to route said control request to said central service control means.

16. A telecommunication network as claimed in claim 14 wherein said signalling transfer means is adapted to initially route said control request to said local control means, and if said marker checking means determines that said local service control means does not contain the most recently modified instructions, said local control means is adapted to return said control request to said signalling transfer means for passage of said control request to said central service control means.

17. A telecommunication network as claimed in claim 1 wherein said remote control means comprises a further local control means like said local control means but at a remote location for controlling a further switch means at a remote location in the network, said local control means, said further local control means and said management means being linked by a wide area network, said local control means, said passing means and said switching means being linked by a local area network.

18. A telecommunication network as claimed in claim 17 wherein said management means is adapted to modify said instructions and/or data of said storage means of said local or further local control means immediately, to associate said marker with equivalent instructions and/or data in said storage means of said further local or local control means respectively, and to subsequently similarly modify said equivalent instructions and/or data of said storage means of said further local or local control means respectively and to reset said marker.

19. A telecommunication network as claimed in claim 18 wherein said local and further local control means comprise service data means for storing said data and service control means for storing and implementing said instructions with reference to said data in said service data means.

20. A telecommunication network as claimed in claim 19 wherein said passing means comprises service transfer means for routing said control request to said local or further local service control means.

21. A telecommunication network as claimed in claim 19 wherein said local and further local service control means each contain a plurality of sets of instructions, a said marker being associated with each set of instructions in said local or further local control means; and said local and further local service data means each contain a plurality of sets of data, a said marker being associated with each set of data in said local or further local service data means.

22. A telecommunication network as claimed in claim 21 wherein said local and further local control means are adapted to store said markers for said sets of instructions.

23. A telecommunication network as claimed in claim 21 wherein said local and further local service data means is adapted to store said markers for said sets of data.

24. A telecommunication network as claimed in claim 20 wherein said local and further local service data means is adapted to store said markers for both said sets of instructions and said sets of data.

25. A telecommunication network as claimed in claim 19 wherein if said marker checking means determines that said local service control means contains the most recently modified instructions, said local service control means is adapted:

to receive said control request from said local switch means, and to initiate the implementation of said instructions by requesting data from said local service data means, and if said marker checking means determines that said data is the most recently modified data, to implement said instructions and control said local switch means, or if said marker checking means determines that said data is not the most recently modified data, to return said control request to said service transfer means for passage of said control request to said further local service control means.

26. A telecommunication network as claimed in claim 25 wherein if said marker checking means determines that said local service control means does not contain the most recently modified instructions, said service transfer means is adapted to route said control request to said further local service control means.

27. A telecommunication network as claimed in claim 1 wherein said switch means comprises a switching arrangement service switching means for generating said control requests and for receiving control instructions from the local or remote control means, all control means for responsive to said service switching means for controlling said switching means.

28. A telecommunication network as claimed in claim 1 comprising a plurality of associated said switch means, said local control means, said marker means and said passing means.

29. A method of controlling the switching of a telecommunication signal in a telecommunication network comprising local switch means for switching the telecommunication signal, local control means containing instructions and/or data for controlling the switching operation of said switch means, and remote control means containing equivalent instructions and/or data for controlling the switching operation of said switch means, the method comprising:

control modification steps of
modifying said instructions and/or data in one of said local and remote control means;
associating a marker with said instructions and/or data contained in said local control means to indicate whether said local control means contains the most recently modified instructions and/or data;
subsequently similarly modifying said instructions and/or data of the other of said local and remote control means;
and switching control steps of
said local switch means requesting control from said local control means;
checking said marker to determine if said instructions and/or data of said local control means are the most recently modified instructions and/or data; and
if it is determined that said instructions and/or data are not the most recently modified instruction and/or data, passing the control request from said local switch means to said remote control means and controlling said local switch means from said remote control means, or if it is determined that said instructions and/or data are the most recently modified instructions and/or data, controlling said local switch means from said local control means; and
controlling said local switch means from said remote control means;
or if it is determined that said instructions and/or data are the most recently modified instructions and/or data, controlling said local switch means from said local control means.

30. A method as claimed in claim 29 wherein said remote control means comprises central control means for controlling the switching of a plurality of said local switch means, the instructions and/or data of said central control means being modified immediately, said marker being associated with said instructions and/or data in said local control means, said instructions and/or data in said local control means being modified similarly and subsequently, and said marker of said local control means being reset.

31. A method as claimed in claim 30 wherein instructions to modify said instructions and/or data are directly communicated with both said local and central control means.

32. A method as claimed in claim 30 wherein instructions to modify said instructions and/or data of said local control means pass through said central control means, and instructions to modify said instructions and/or data of said central control means are directly communicated.

33. A method as claimed in claim 29 wherein said marker comprises a marker for said instructions and a marker for said data, the switching control steps including
receiving said control request,
checking the instruction marker, if the instruction marker indicates that the instructions are the most recently modified, checking the data marker,
if the data marker indicates that the data is the most recently modified, implementing the instructions and controlling said local switch means,
if the data marker indicates that the data is not the most recently modified, passing the control request to said remote control means, implementing the instructions in said remote control means and controlling said local switch means,
if the instruction marker indicates that the instructions are not the most recently modified passing said control request to said central control means.

34. A method as claimed in claim 29 wherein said remote control means comprises a further local control means like said local control means but at a remote location for controlling a further switch means at a remote location in the network, said local control means and said further local control means communicating over a wide area network.

35. A method as claimed in claim 34 wherein said control modification steps comprise the steps of:
modifying said instructions and/or data in one of said local and further local control means immediately;
associating said marker with instructions and/or data in the other of said local and further local control means respectively; and
subsequently similarly modifying said instructions and/or data in the other of said local and further local control means respectively and resetting said marker.

36. A method as claimed in claim 34 wherein said marker comprises an instruction marker for said instructions and a data marker for said data, said switching control steps comprising the steps of receiving said control request from said local switch means,
checking said instruction marker to determine if said local control means contains the most recently modified instructions,
if said local control means is determined to contain the most recently modified instructions, said data marker is checked to determine if said data is the most recently modified, if said data is the most recently modified said local control means implements said instructions and controls said local switch means, if said data is not the most recently modified data said control request is passed to said further local control means which controls said local switch means,
if said local control means is determined not to contain the most recently modified instruction, said control request is passed to said further local control means which controls said local switch means.

37. A method as claimed in claim 36 wherein said network includes a plurality of said local control means, said step of passing said control request including the step of determining which of said local control means contains the most recently modified instructions and/or data.

38. A method as claimed in claim 33 wherein said step of passing said control request includes the step of hunting for a said local control means containing the most recently modified instructions and/or data.

39. A local switching arrangement for use in the method of claim 29 comprising:

said local switching means for receiving and switching a telecommunication signal to remote switch means in the telecommunication network;

said local control means including storage means for storing instructions and/or data and a marker associated with said instructions and/or data, said local control means being adapted to use said stored instructions and/or data to control the switching operation of said local switch means;

receiving means for receiving instructions to set said marker to mark said instructions and/or data as being out of date;

said switch means being adapted to request control from said local control means;

marker checking means for checking said marker to determine if said instructions and/or data are out of date;

passing means responsive to said marker means for passing the control request from said local control means to a similar remote control means if said marker checking means determines that said instructions and/or data are out of date;

said receiving means being adapted to receive instructions to update said instructions and/or data stored in said storage means and to reset said marker to mark said instructions and/or data as being updated.

40. A local switching arrangement as claimed in claim 39 wherein said local control means comprises local service data means for storing said data, and local service control means for storing and implementing said instructions with reference to said data in said local service data means.

41. A local switching arrangement as claimed in claim 40 wherein said passing means comprises signalling transfer means for receiving and routing said control request to said local service control means or a remote service control means in said remote control means.

42. A local switching arrangement as claimed in claim 40 wherein said local and remote service control means each contain a plurality of sets of instructions, a said marker being associated with each set of instructions in said local service control means; said local and remote service data means containing a plurality of sets of data, a said marker being associated with each set of data in said local service data means.

43. A local switching arrangement as claimed in claim 42 wherein said local service control means is adapted to store said markers for said sets of instructions.

44. A local switching arrangement as claimed in claim 42 wherein said signalling transfer means is adapted to store said markers for said sets of instructions.

45. A local switching arrangement as claimed in claim 43 wherein said local service data means is adapted to store said markers for said sets of data.

46. A local switching arrangement as claimed in claim 42 wherein said local service data means is adapted to store said markers for both said sets of instructions and said sets of data.

47. A local switching arrangement as claimed in claim 41 wherein if said marker checking means determines that said local service control means contains the most updated instructions, said local service control means is adapted to receive said control request from said switch means, to initiate the implementation of said instructions by requesting data from said local service data means, and if said marker checking means determines that said data is the most recently modified data, to implement said instructions and control said local switch means, or if said marker checking means determines that said data is not the most recently modified data, to return said control request to said signalling transfer means for passage of said control request to said remote service control means.

48. A local switching arrangement as claimed in claim 47 wherein if said marker checking means determines that said local service control means contains out of date instructions, said service transfer means is adapted to route said control request to said remote service control means.

49. A local switching arrangement as claimed in claim 47 wherein said signalling transfer means is adapted to initially route said control request to said local control means, and if said marker checking means determines that said local service control means does not contain the most recently modified instructions, said local control means is adapted to return said control request to said signalling transfer means for passage of said control request to said remote service control means.

* * * * *